US012598603B2

(12) United States Patent (10) Patent No.: US 12,598,603 B2
Wang et al. (45) Date of Patent: Apr. 7, 2026

(54) USER EQUIPMENT PREEMPTION OF SIDELINK COMMUNICATIONS

(71) Applicant: QUALCOMM Incorporated, San Diego, CA (US)

(72) Inventors: Xiaojie Wang, Hillsborough, NJ (US); Xiaoxia Zhang, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 664 days.

(21) Appl. No.: 17/662,682

(22) Filed: May 10, 2022

(65) Prior Publication Data

US 2023/0371019 A1 Nov. 16, 2023

(51) Int. Cl.
| | |
|---|---|
| *H04W 72/12* | (2023.01) |
| *H04L 1/00* | (2006.01) |
| *H04W 72/1263* | (2023.01) |
| *H04W 72/20* | (2023.01) |
| *H04W 72/566* | (2023.01) |

(52) U.S. Cl.
CPC ....... *H04W 72/1263* (2013.01); *H04L 1/0003* (2013.01); *H04W 72/20* (2023.01); *H04W 72/569* (2023.01)

(58) Field of Classification Search
CPC ............. H04W 72/1263; H04W 72/20; H04W 72/569; H04W 8/20; H04W 36/0072; H04W 72/25; H04W 72/23; H04W 72/40; H04L 1/0003; H04L 1/0007
See application file for complete search history.

(56) References Cited

U.S. PATENT DOCUMENTS

| | | | | |
|---|---|---|---|---|
| 10,609,699 | B2 * | 3/2020 | Park | H04W 72/23 |
| 10,785,792 | B2 * | 9/2020 | Wang | H04W 72/23 |
| 10,966,240 | B2 * | 3/2021 | Hosseini | H04W 72/23 |
| 11,178,653 | B2 * | 11/2021 | Park | H04L 5/0048 |
| 11,229,036 | B2 * | 1/2022 | Yang | H04W 72/044 |
| 11,233,607 | B2 * | 1/2022 | He | H04L 5/0055 |
| 11,546,937 | B2 * | 1/2023 | Cao | H04L 1/1887 |
| 11,627,585 | B2 * | 4/2023 | Hosseini | H04W 72/56 |
| | | | | 370/329 |
| 11,902,196 | B2 * | 2/2024 | Wong | H04W 72/569 |
| 12,245,084 | B2 * | 3/2025 | Yu | H04W 72/20 |
| 2018/0191470 | A1 * | 7/2018 | Manolakos | H04L 1/1864 |
| 2018/0278380 | A1 * | 9/2018 | Kim | H04L 1/1671 |
| 2020/0351022 | A1 * | 11/2020 | Choe | H04L 1/1812 |
| 2021/0065447 | A1 * | 3/2021 | Lee | G06T 19/00 |
| 2021/0190530 | A1 * | 6/2021 | Jung | G08G 1/09626 |
| 2021/0281375 | A1 * | 9/2021 | Wang | H04L 5/0044 |
| 2021/0297197 | A1 * | 9/2021 | Zhou | H04L 1/189 |

(Continued)

FOREIGN PATENT DOCUMENTS

| | | | | |
|---|---|---|---|---|
| CN | 112956258 B | * | 5/2023 | H04W 28/26 |

*Primary Examiner* — Mewale A Ambaye

(74) *Attorney, Agent, or Firm* — Harrity & Harrity, LLP

(57) ABSTRACT

In some aspects, a user equipment (UE) may determine that one or more conditions are satisfied for preemption of a scheduled sidelink transmission. The UE may transmit a sidelink preemption indication that indicates that a set of resources associated with the scheduled sidelink transmission are to be preempted. The UE may use the set of resources for transmission or reception of another communication. Numerous other aspects are described.

30 Claims, 13 Drawing Sheets

(56)         References Cited

U.S. PATENT DOCUMENTS

2021/0410175 A1*  12/2021  Xue ..................... H04W 72/23
2022/0095391 A1*   3/2022  Jo ...................... H04W 74/002
2022/0174682 A1*   6/2022  Li ..................... H04W 72/1263
2022/0248376 A1*   8/2022  Hui ........................ H04L 5/001
2022/0386346 A1*  12/2022  Zhao ..................... H04W 4/70
2022/0394560 A1*  12/2022  Yu .................... H04W 72/0446
2024/0064730 A1*   2/2024  Andersson ........ H04W 52/0216
2024/0107616 A1*   3/2024  Kim .................... H04W 76/15

* cited by examiner

1010 — Determine that one or more conditions are satisfied for preemption of a scheduled sidelink transmission 1020 — Transmit a sidelink preemption indication that indicates that a set of resources associated with the scheduled sidelink transmission are to be preempted 1030 — Use the set of resources for transmission or reception of another communication

1000

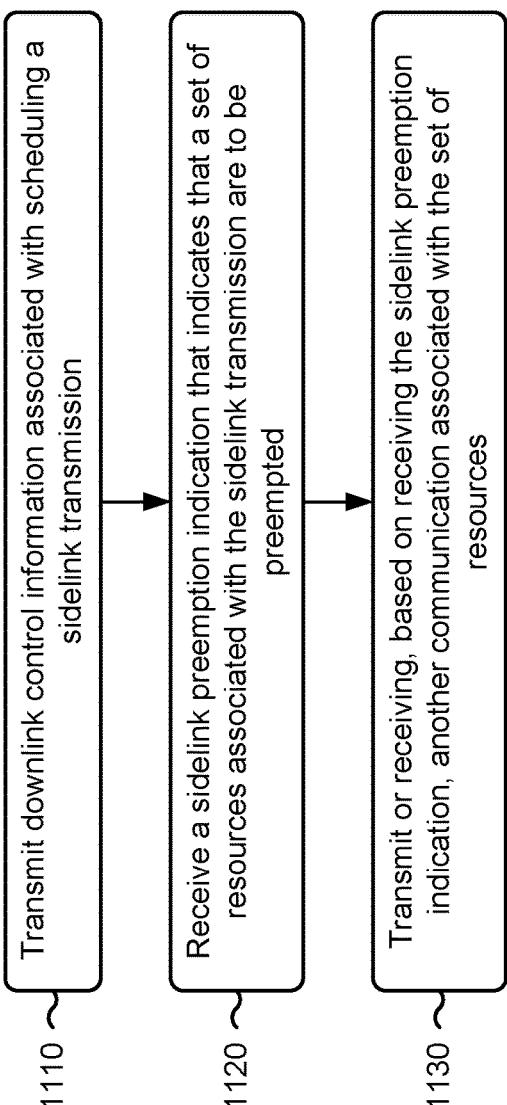

1110 — Transmit downlink control information associated with scheduling a sidelink transmission 1120 — Receive a sidelink preemption indication that indicates that a set of resources associated with the sidelink transmission are to be preempted 1130 — Transmit or receiving, based on receiving the sidelink preemption indication, another communication associated with the set of resources

USER EQUIPMENT PREEMPTION OF SIDELINK COMMUNICATIONS

FIELD OF THE DISCLOSURE

Aspects of the present disclosure generally relate to wireless communication and to techniques and apparatuses for user equipment preemption of sidelink communications.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining that one or more conditions are satisfied for preemption of a scheduled sidelink transmission. The method may include transmitting a sidelink preemption indication that indicates that a set of resources associated with the scheduled sidelink transmission are to be preempted. The method may include using the set of resources for transmission or reception of another communication.

Some aspects described herein relate to a method of wireless communication performed by a network entity. The method may include transmitting downlink control information associated with scheduling a sidelink transmission. The method may include receiving a sidelink preemption indication that indicates that a set of resources associated with the sidelink transmission are to be preempted. The method may include transmitting or receiving, based on receiving the sidelink preemption indication, another communication associated with the set of resources.

Some aspects described herein relate to a UE for wireless communication. The user equipment may include a memory and one or more processors coupled to the memory. The one or more processors may be configured to determine that one or more conditions are satisfied for preemption of a scheduled sidelink transmission. The one or more processors may be configured to transmit a sidelink preemption indication that indicates that a set of resources associated with the scheduled sidelink transmission are to be preempted. The one or more processors may be configured to use the set of resources for transmission or reception of another communication.

Some aspects described herein relate to a network entity for wireless communication. The network entity may include a memory and one or more processors coupled to the memory. The one or more processors may be configured to transmit downlink control information associated with scheduling a sidelink transmission. The one or more processors may be configured to receive a sidelink preemption indication that indicates that a set of resources associated with the sidelink transmission are to be preempted. The one or more processors may be configured to transmit or receiving, based on receiving the sidelink preemption indication, another communication associated with the set of resources.

Some aspects described herein relate to a non-transitory computer-readable medium that stores a set of instructions for wireless communication by a UE. The set of instructions, when executed by one or more processors of the UE, may cause the UE to determine that one or more conditions are satisfied for preemption of a scheduled sidelink transmission. The set of instructions, when executed by one or more processors of the UE, may cause the UE to transmit a sidelink preemption indication that indicates that a set of resources associated with the scheduled sidelink transmission are to be preempted. The set of instructions, when executed by one or more processors of the UE, may cause the UE to use the set of resources for transmission or reception of another communication.

Some aspects described herein relate to a non-transitory computer-readable medium that stores a set of instructions for wireless communication by a network entity. The set of instructions, when executed by one or more processors of the network entity, may cause the network entity to transmit downlink control information associated with scheduling a sidelink transmission. The set of instructions, when executed by one or more processors of the network entity, may cause the network entity to receive a sidelink preemption indication that indicates that a set of resources associated with the sidelink transmission are to be preempted. The set of instructions, when executed by one or more processors of the network entity, may cause the network entity to transmit or receiving, based on receiving the sidelink preemption indication, another communication associated with the set of resources.

Some aspects described herein relate to an apparatus for wireless communication. The apparatus may include means for determining that one or more conditions are satisfied for preemption of a scheduled sidelink transmission. The apparatus may include means for transmitting a sidelink preemption indication that indicates that a set of resources associated with the scheduled sidelink transmission are to be preempted. The apparatus may include means for using the set of resources for transmission or reception of another communication.

Some aspects described herein relate to an apparatus for wireless communication. The apparatus may include means for transmitting downlink control information associated with scheduling a sidelink transmission. The apparatus may include means for receiving a sidelink preemption indication that indicates that a set of resources associated with the sidelink transmission are to be preempted. The apparatus may include means for transmitting or receiving, based on receiving the sidelink preemption indication, another communication associated with the set of resources.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10-11 are diagrams illustrating example processes associated with UE preemption of sidelink communications, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
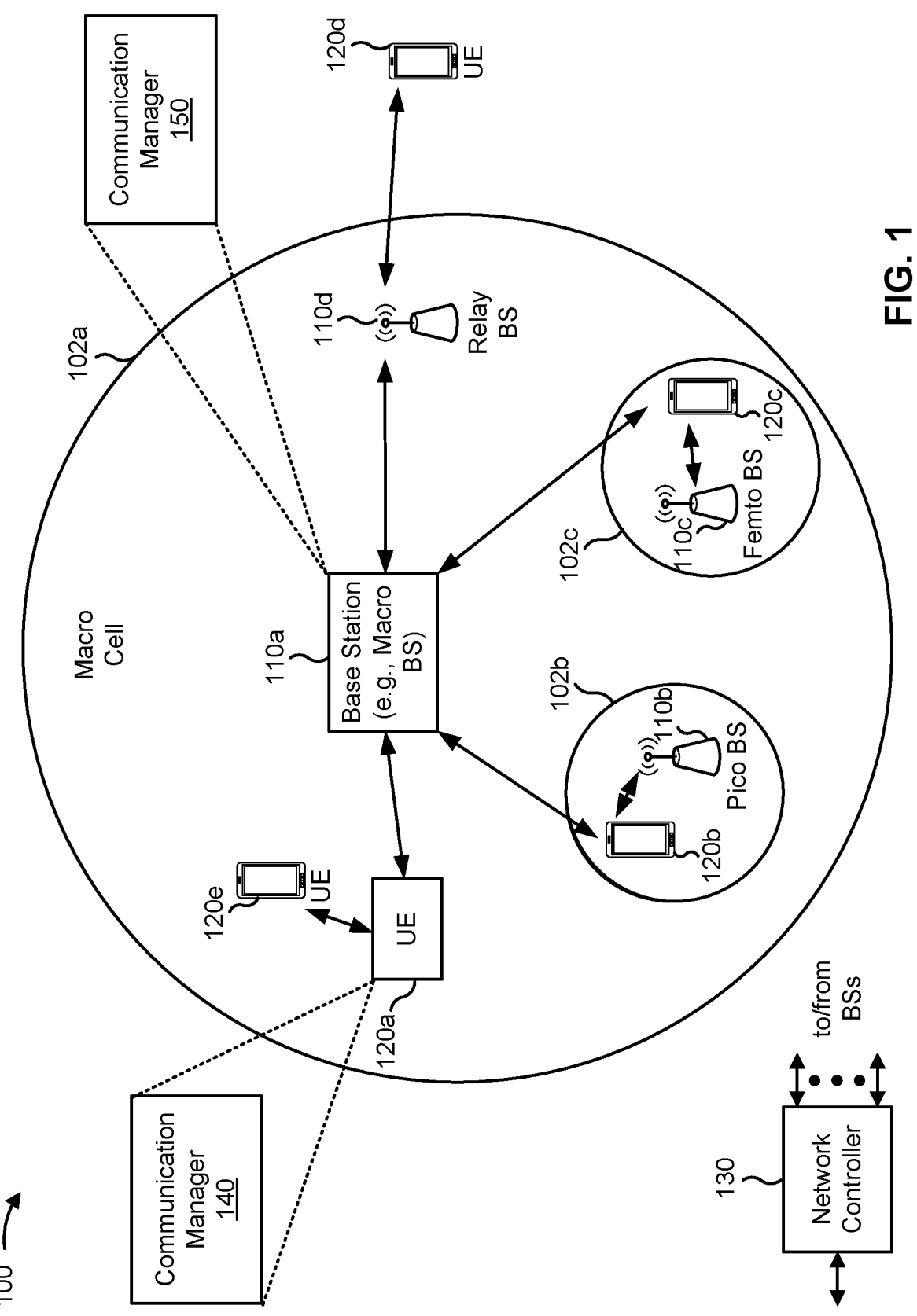
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a centralized unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IOT) devices, and/or may be implemented as NB-IOT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHZ), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine that one or more conditions are satisfied for preemption of a scheduled sidelink transmission; transmit a sidelink preemption indication that indicates that a set of resources associated with the scheduled sidelink transmission are to be preempted; and use the set of resources for transmission or reception of another communication. Additionally, or alternatively, the communication manager 140 may perform one or more other operations described herein.

In some aspects, the network entity (e.g., base station 110) may include a communication manager 150. As described in more detail elsewhere herein, the communication manager 150 may transmit downlink control information associated with scheduling a sidelink transmission; receive a sidelink preemption indication that indicates that a set of resources associated with the sidelink transmission are to be preempted; and transmit or receiving, based on receiving the sidelink preemption indication, another communication associated with the set of resources. Additionally, or alternatively, the communication manager 150 may perform one or more other operations described herein.

As indicated above, FIG. 1 is provided as an example. Other examples may differ from what is described with regard to FIG. 1.

Figure 2:
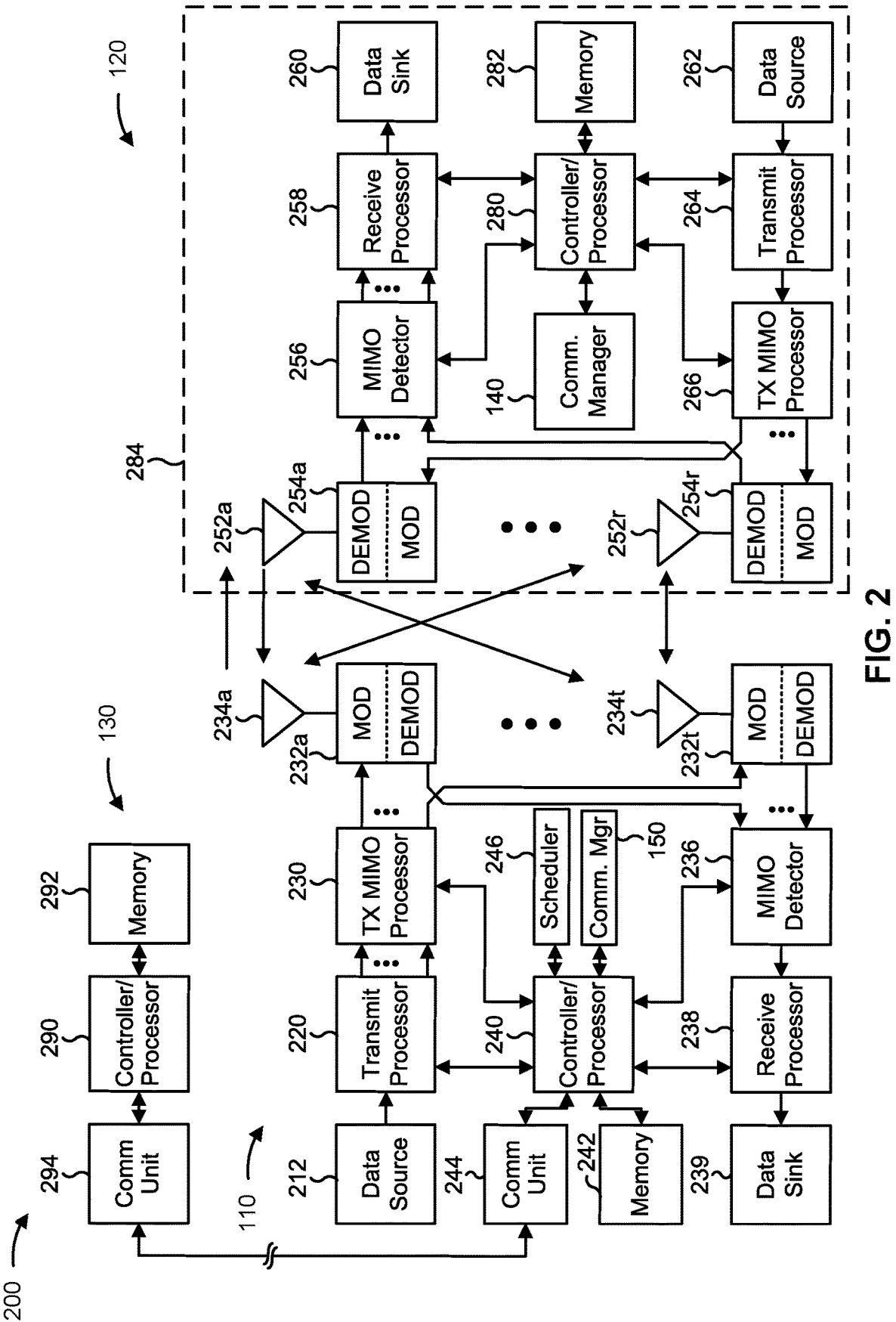
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-13).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-13).

The controller/processor 240 of the base station 110, the controller/processor 280 of the UE 120, and/or any other component(s) of FIG. 2 may perform one or more techniques associated with user equipment preemption of sidelink communications, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE includes means for determining that one or more conditions are satisfied for preemption of a scheduled sidelink transmission; means for transmitting a sidelink preemption indication that indicates that a set of resources associated with the scheduled sidelink transmission are to be preempted; and/or means for using the set of resources for transmission or reception of another communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity (e.g., base station 110) includes means for transmitting downlink control information associated with scheduling a sidelink transmission; means for receiving a sidelink preemption indication that indicates that a set of resources associated with the sidelink transmission are to be preempted; and/or means for transmitting or receiving, based on receiving the sidelink preemption indication, another communication associated with the set of resources. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
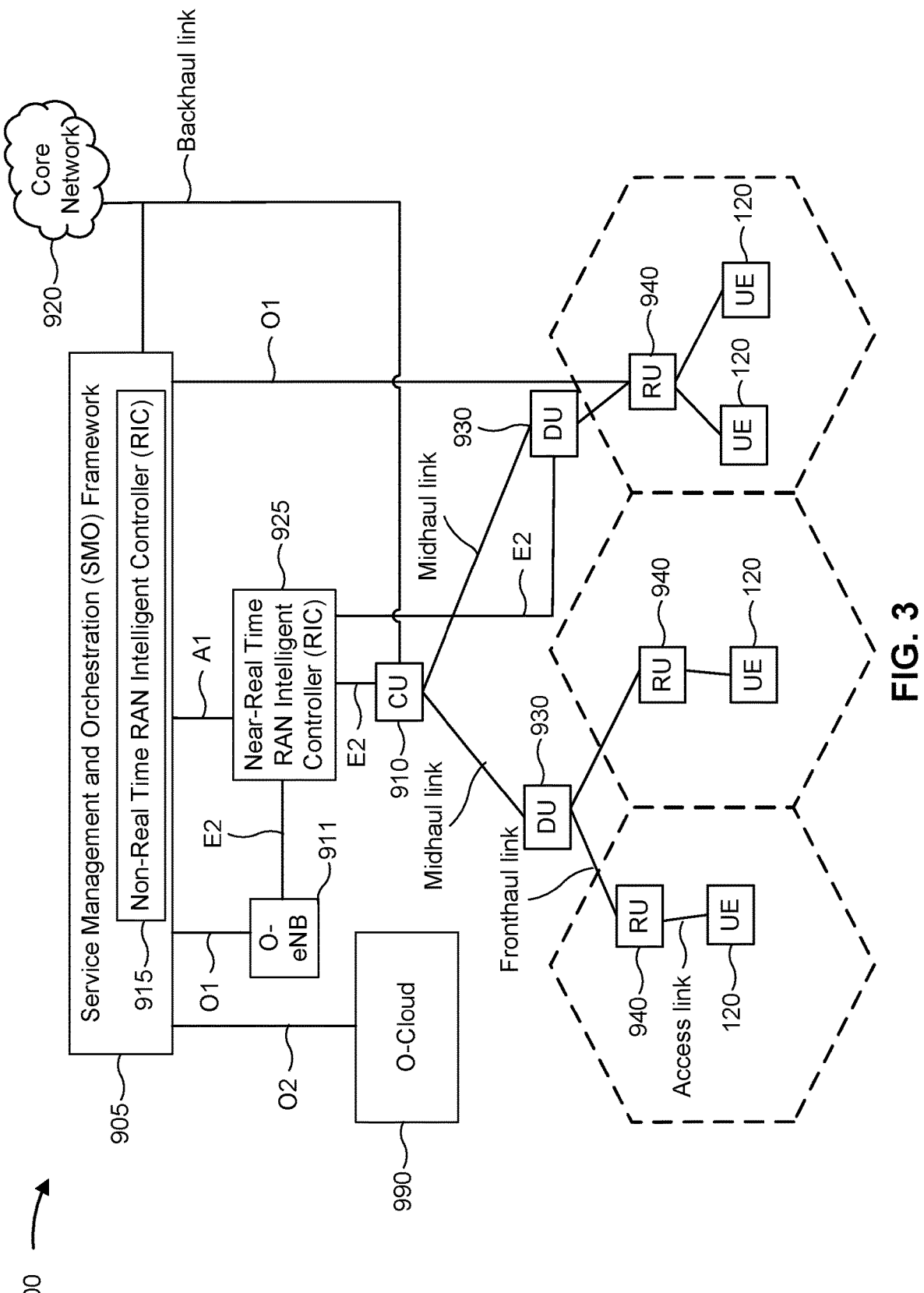
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective RF access links. In some implementations, a UE 120 may be simultaneously served by multiple RUs 340.

Each of the units, including the CUS 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an Open RAN (O-RAN) configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples.

In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts radio frequency (RF) processing functions or low-PHY layer functions, such as performing an FFT, performing an iFFT, digital beamform-ing, or PRACH extraction and filtering, among other examples, based at least in part on a functional split (for example, a functional split defined by the 3GPP), such as a lower layer functional split. In such an architecture, each RU 340 can be operated to handle over the air (OTA) commu-nication with one or more UEs 120. In some implementa-tions, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 inter-face). For virtualized network elements, the SMO Frame-work 305 may be configured to interact with a cloud computing platform (such as an open cloud (O-Cloud) platform 390) to perform network element life cycle man-agement (such as to instantiate virtualized network ele-ments) via a cloud computing platform interface (such as an O2 interface). Such virtualized network elements can include, but are not limited to, CUs 310, DUs 330, RUs 340, non-RT RICs 315, and Near-RT RICs 325. In some imple-mentations, the SMO Framework 305 can communicate with a hardware aspect of a 4G RAN, such as an open eNB (O-eNB) 311, via an O1 interface. Additionally, in some implementations, the SMO Framework 305 can communi-cate directly with each of one or more RUs 340 via a respective O1 interface. The SMO Framework 305 also may include a Non-RT RIC 315 configured to support function-ality of the SMO Framework 305.

The Non-RT RIC 315 may be configured to include a logical function that enables non-real-time control and opti-mization of RAN elements and resources, Artificial Intelli-gence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Frame-work 305 or the Non-RT RIC 315 from non-network data sources or from network functions. In some examples, the Non-RT RIC 315 or the Near-RT RIC 325 may be config-ured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
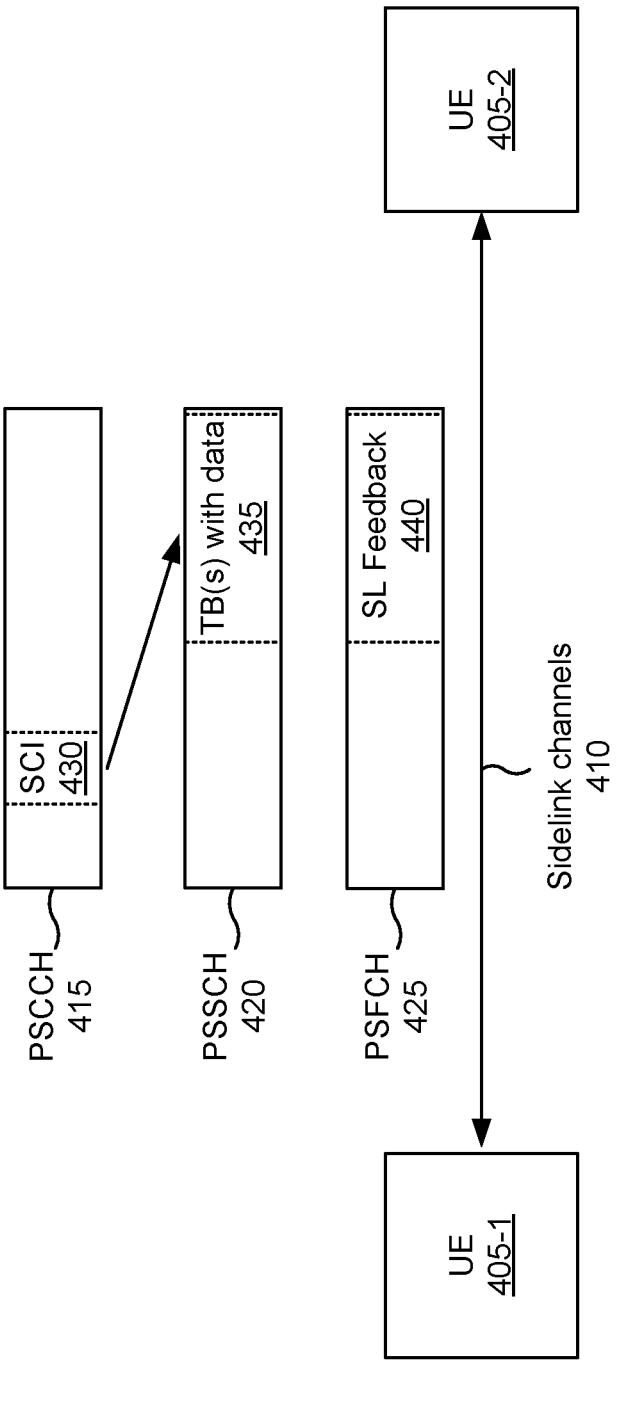
FIG. 4 is a diagram illustrating an example of sidelink communications, in accordance with the present disclosure.

FIG. 4 is a diagram illustrating an example 400 of sidelink communications, in accordance with the present disclosure.

As shown in FIG. 4, a first UE 405-1 may communicate with a second UE 405-2 (and one or more other UEs 405) via one or more sidelink channels 410. The UEs 405-1 and 405-2 may communicate using the one or more sidelink channels 410 for P2P communications, D2D communica-tions, V2X communications (e.g., which may include V2V communications, V2I communications, and/or V2P commu-nications) and/or mesh networking. In some aspects, the UEs 405 (e.g., UE 405-1 and/or UE 405-2) may correspond to one or more other UEs described elsewhere herein, such as UE 120. In some aspects, the one or more sidelink channels 410 may use a PC5 interface and/or may operate in a high frequency band (e.g., the 5.9 GHz band). Addition-ally, or alternatively, the UEs 405 may synchronize timing of transmission time intervals (TTIs) (e.g., frames, subframes, slots, or symbols) using global navigation satellite system (GNSS) timing.

As further shown in FIG. 4, the one or more sidelink channels 410 may include a physical sidelink control chan-nel (PSCCH) 415, a physical sidelink shared channel (PSSCH) 420, and/or a physical sidelink feedback channel (PSFCH) 425. The PSCCH 415 may be used to communi-cate control information, similar to a physical downlink control channel (PDCCH) and/or a physical uplink control channel (PUCCH) used for cellular communications with a base station 110 via an access link or an access channel. PSSCH 420 may be used to communicate data, similar to a physical downlink shared channel (PDSCH) and/or a physi-cal uplink shared channel (PUSCH) used for cellular com-munications with a base station 110 via an access link or an access channel. For example, the PSCCH 415 may carry sidelink control information (SCI) 430, which may indicate various control information used for sidelink communica-tions, such as one or more resources (e.g., time resources, frequency resources, and/or spatial resources) where a trans-port block (TB) 435 may be carried on the PSSCH 420. The TB 435 may include data. The PSFCH 425 may be used to communicate sidelink feedback 440, such as hybrid auto-matic repeat request (HARQ) feedback (e.g., acknowledge-ment or negative acknowledgement (ACK/NACK) informa-tion), transmit power control (TPC), and/or a scheduling request (SR).

Although shown on the PSCCH 415, in some aspects, the SCI 430 may include multiple communications in different stages, such as a first stage SCI (SCI-1) and a second stage SCI (SCI-2). The SCI-1 may be transmitted on the PSCCH 415. The SCI-2 may be transmitted on the PSSCH 420. The SCI-1 may include, for example, an indication of one or more resources (e.g., time resources, frequency resources, and/or spatial resources) on the PSSCH 420, information for decoding sidelink communications on the PSSCH, a quality of service (QOS) priority value, a resource reservation period, a PSSCH DMRS pattern, an SCI format for the SCI-2, a beta offset for the SCI-2, a quantity of PSSCH DMRS ports, and/or an MCS. The SCI-2 may include information associated with data transmissions on the PSSCH 420, such as a HARQ process ID, a new data indicator (NDI), a source identifier, a destination identifier, and/or a channel state information (CSI) report trigger.

In some aspects, the one or more sidelink channels 410 may use resource pools. For example, a scheduling assignment (e.g., included in SCI 430) may be transmitted in sub-channels using specific resource blocks (RBs) across time. In some aspects, data transmissions (e.g., on the PSSCH 420) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 405 may operate using a sidelink transmission mode (e.g., Mode 1) where resource selection and/or scheduling is performed by a base station 110. For example, the UE 405 may receive a grant (e.g., in downlink control information (DCI) or in an RRC message, such as for configured grants) from the base station 110 for sidelink channel access and/or scheduling. In some aspects, a UE 405 may operate using a transmission mode (e.g., Mode 2) where resource selection and/or scheduling is performed by the UE 405 (e.g., rather than a base station 110). In some aspects, the UE 405 may perform resource selection and/or scheduling by sensing channel availability for transmissions. For example, the UE 405 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 405 may perform resource selection and/or scheduling using SCI 430 received in the PSCCH 415, which may indicate occupied resources and/or channel parameters. Additionally, or alternatively, the UE 405 may perform resource selection and/or scheduling by determining a channel busy ratio (CBR) associated with various sidelink channels, which may be used for rate control (e.g., by indicating a maximum number of resource blocks that the UE 405 can use for a particular set of subframes).

In the transmission mode where resource selection and/or scheduling is performed by a UE 405, the UE 405 may generate sidelink grants, and may transmit the grants in SCI 430. A sidelink grant may indicate, for example, one or more parameters (e.g., transmission parameters) to be used for an upcoming sidelink transmission, such as one or more resource blocks to be used for the upcoming sidelink transmission on the PSSCH 420 (e.g., for TBs 435), one or more subframes to be used for the upcoming sidelink transmission, and/or an MCS to be used for the upcoming sidelink transmission. In some aspects, a UE 405 may generate a sidelink grant that indicates one or more parameters for semi-persistent scheduling (SPS), such as a periodicity of a sidelink transmission. Additionally, or alternatively, the UE 405 may generate a sidelink grant for event-driven scheduling, such as for an on-demand sidelink message.

As indicated above, FIG. 4 is provided as an example. Other examples may differ from what is described with respect to FIG. 4.

Figure 5:
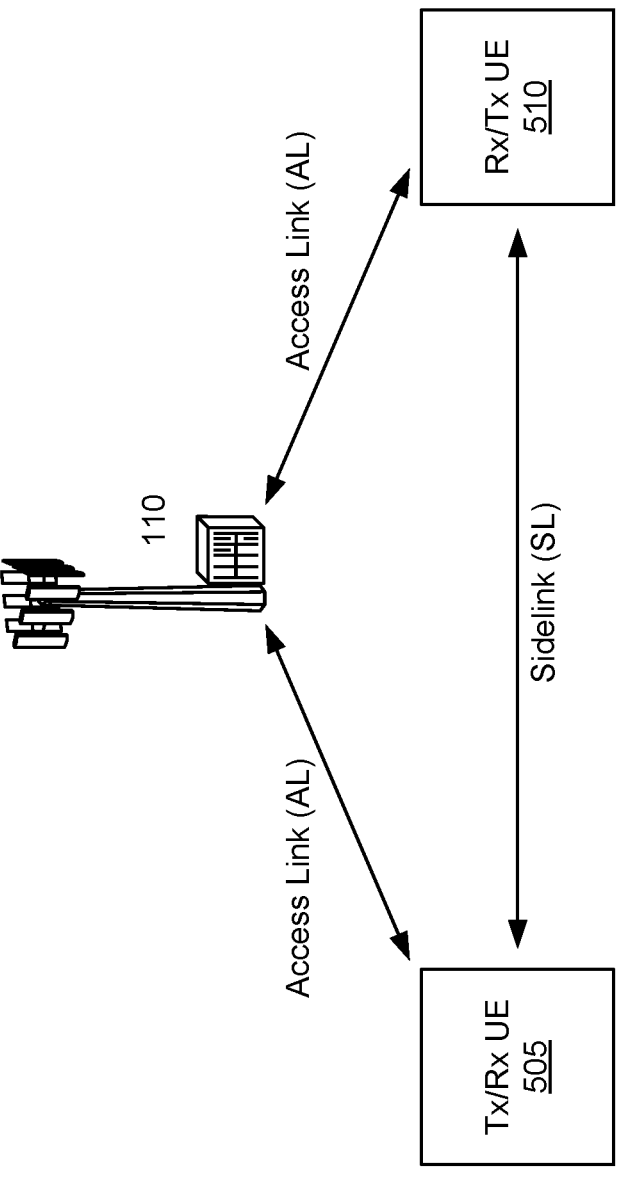
FIG. 5 is a diagram illustrating an example of sidelink communications and access link communications, in accordance with the present disclosure.

FIG. 5 is a diagram illustrating an example 500 of sidelink communications and access link communications, in accordance with the present disclosure.

As shown in FIG. 5, a transmitter (Tx)/receiver (Rx) UE 505 and an Rx/Tx UE 510 may communicate with one another via a sidelink, as described above in connection with FIG. 4. As further shown, in some sidelink modes, a base station 110 may communicate with the Tx/Rx UE 505 via a first access link. Additionally, or alternatively, in some sidelink modes, the base station 110 may communicate with the Rx/Tx UE 510 via a second access link. The Tx/Rx UE 505 and/or the Rx/Tx UE 510 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 5 is provided as an example. Other examples may differ from what is described with respect to FIG. 5.

Figure 6:
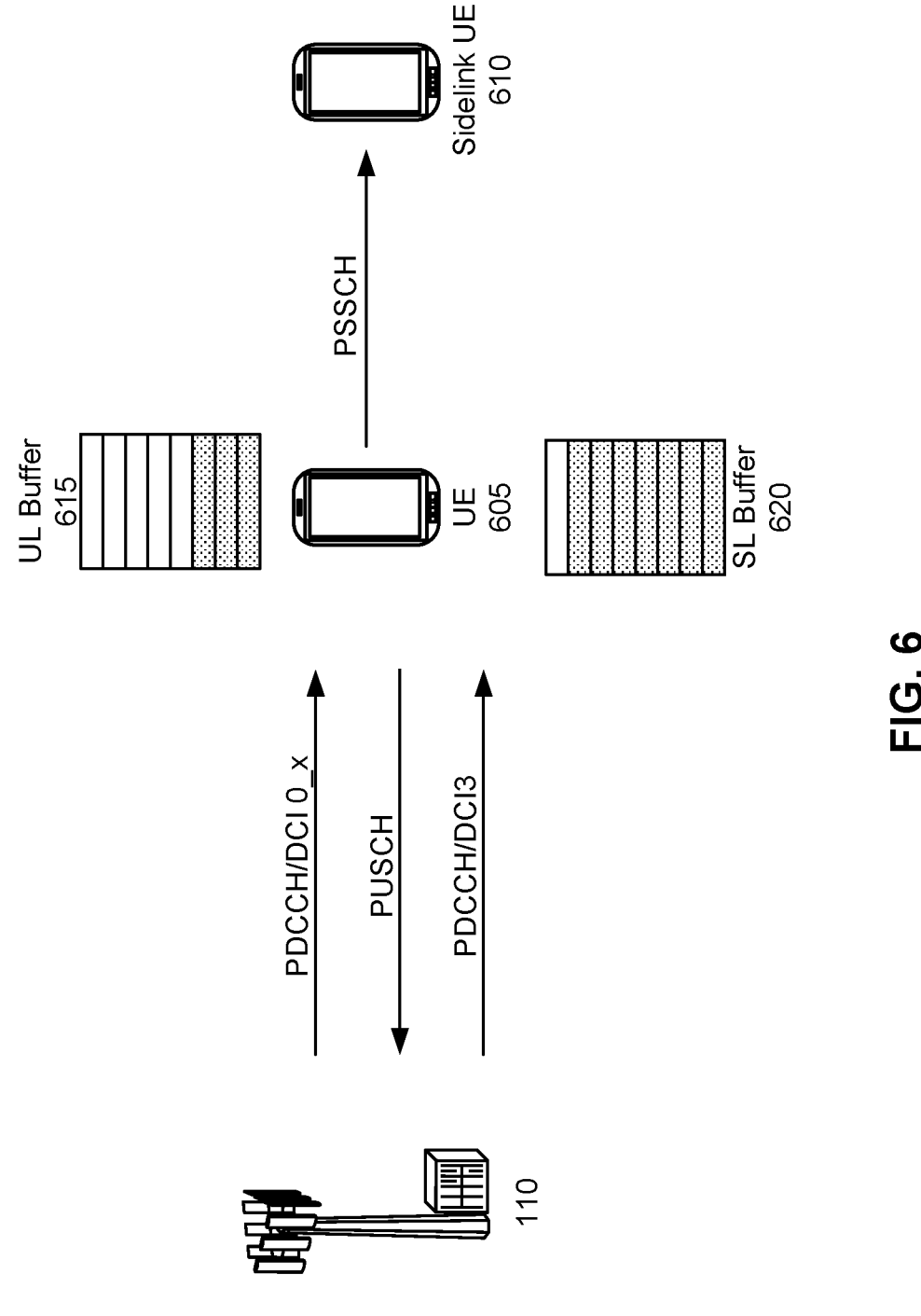
FIG. 6 is a diagram illustrating an example of sidelink transmission scheduling, in accordance with the present disclosure.

FIG. 6 is a diagram illustrating an example 600 of sidelink transmission scheduling, in accordance with the present disclosure. As shown in FIG. 6, a base station 110 and a UE 605 (e.g., a UE 120) may communicate with one another, and the UE 605 may communicate with a sidelink UE 610 (e.g., a UE 120) via a sidelink, as described herein.

As shown in FIG. 6, a UE 605 that supports both uplink and sidelink communications may have separately scheduled transmissions. For example, the base station 110 may schedule uplink transmissions for the UE 605 using a PDCCH message carrying uplink scheduling information (e.g., using RRC and/or a first type of DCI, such as DCI 0_X). The uplink scheduling information may indicate an uplink grant, which specifies resources available to the UE 605 for uplink transmissions. The base station 110 may separately schedule sidelink transmissions for the UE 605 using another PDCCH message carrying sidelink scheduling information (e.g., using RRC and/or a second type of DCI, such as DCI 3). The sidelink scheduling information may indicate a sidelink grant, which specifies resources available to the UE 605 for sidelink transmissions.

In some situations, the UE 605 may have two buffers, or queues, for different transmissions, such as an uplink buffer 615 for uplink transmissions and a sidelink buffer 620 for sidelink transmissions. The UE 605 may use separate buffer status reports (BSRs) to communicate the statuses of these transmission buffers (e.g., to the base station 110). The base station 110 may use information communicated in the BSRs to schedule the uplink and sidelink transmissions for the UE 605.

In some situations, a UE or base station may identify a high priority communication (e.g., an urgent communication, such as an ultra-reliable low latency communication (URLLC)) that should be transmitted prior to lower priority communications (e.g., enhanced mobile broadband (eMBB) communications) that are already scheduled. Some mechanisms exist for a UE to preempt resources scheduled for uplink communications (e.g., an uplink cancellation indication), or for a base station to preempt resources scheduled for downlink communications (e.g., a downlink cancellation indication). Preemption may enable a UE and/or base station to preempt resources used for communications between the UE and the base station, such that the preempted resources may be used for higher priority communications. However, in a situation where a UE has scheduled sidelink communications (e.g., a scheduled PSSCH communication), the UE is not able to preempt resources associated with the sidelink communications for a more urgent communication involving the UE. In some situations, this may result in a UE transmitting lower priority sidelink communications before other higher priority communications, including higher priority sidelink and/or uplink communications. This may cause high priority communications to be delayed, which may negatively impact UE operations that rely on high priority communications, such as public safety communications, positioning information, communications used to avoid network communication disruption, and/or the like.

As indicated above, FIG. 6 is provided as an example. Other examples may differ from what is described with respect to FIG. 6.

Some techniques and apparatuses described herein enable a UE to preempt sidelink communications. For example, a UE may be configured with one or more conditions that, when satisfied, enable the UE to preempt resources associated with a scheduled sidelink transmission. The UE may transmit, to a network entity and/or a sidelink UE, a sidelink preemption indication (SLPI) that indicates the preempted resources. This may enable the UE and/or the network entity to use the preempted resources for transmission and/or reception of another communication. As a result, the UE may be better able to manage sidelink communications, as well as communications with a network entity, to prioritize transmissions in a manner that may improve latency and avoid delays for high priority communications (e.g., time-sensitive communications). This may avoid negative impacts to high priority communications, such as public safety communications, positioning information, communications used to avoid network communication disruption, and/or the like, which might otherwise occur if the UE was unable to preempt sidelink communications.

Figure 7:
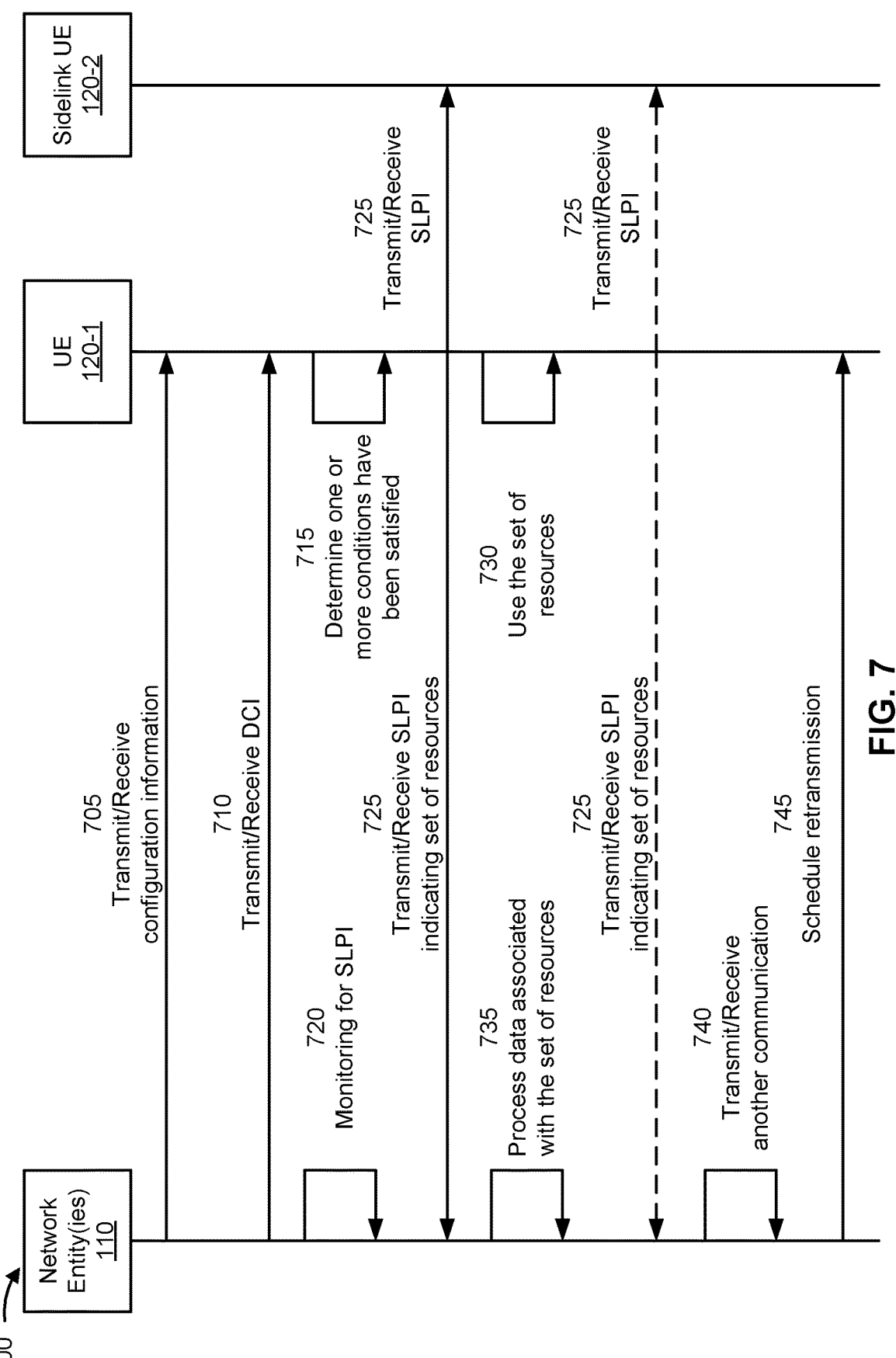
FIG. 7 is a diagram illustrating an example associated with UE preemption of sidelink communications, in accordance with the present disclosure.

FIG. 7 is a diagram of an example 700 associated with UE preemption of sidelink communications, in accordance with the present disclosure. As shown in FIG. 7, a network entity (e.g., base station 110) or network entities may communicate with a UE (e.g., UE 120-1) and a sidelink UE (e.g., UE 120-2). In some aspects, the network entity, the UE, and the sidelink UE may be part of a wireless network (e.g., wireless network 100). The UE and the network entity may have established one or more wireless connections prior to operations shown in FIG. 7.

As shown by reference number 705, the network entity may transmit, and the UE may receive, configuration information. In some aspects, the UE may receive the configuration information via one or more of RRC signaling, one or more MAC control elements (CEs), and/or DCI, among other examples. In some aspects, the configuration information may include an indication of one or more configuration parameters (e.g., already known to the UE and/or previously indicated by the network entity or other network device) for selection by the UE, and/or explicit configuration information for the UE to use to configure the UE, among other examples.

In some aspects, the configuration information may indicate that the UE is permitted to preempt sidelink communications. For example, the configuration information may indicate one or more conditions that should be satisfied to enable the UE to preempt at least a portion of the resources for a scheduled sidelink communication. For example, the configuration information may indicate a priority threshold that indicates when the UE is to preempt a sidelink transmission. In some aspects, the configuration information may include other information to facilitate the preemption of sidelink communications, such as information identifying resources for the UE to use to transmit a SLPI, conditions for the transmission of the SLPI, information identifying a format of the SLPI, and/or the like.

In some aspects, the configuration information may indicate a periodicity of the resources configured for the SLPI. For example, the resources may be configured for semi-static activation, semi-persistent activation, and/or for aperiodic activation.

The UE may configure itself based at least in part on the configuration information. In some aspects, the UE may be configured to perform one or more operations described herein based at least in part on the configuration information.

As shown by reference number 710, the network entity may transmit, and the UE may receive, DCI associated with scheduling a sidelink transmission. For example, and as described herein, the network entity may transmit a DCI (e.g., DCI 0_x) via PDCCH to schedule resources for a sidelink transmission from the UE to the sidelink UE. In some aspects, the sidelink transmission may be associated with a corresponding measure of priority. For example, a priority type of the sidelink transmission may indicate whether it is of high or low priority relative to other types of communications (e.g., URLLC communications may be higher priority than eMBB communications).

As shown by reference number 715, the UE may determine that one or more conditions are satisfied for preemption of a scheduled sidelink transmission. In some aspects, the one or more conditions may have been previously indicated by the network entity. For example, the one or more conditions may have been indicated in the configuration information and/or the DCI that scheduled the sidelink transmission.

In some aspects, the UE may determine that one or more conditions are satisfied based at least in part on determining that another communication has a priority that satisfies a priority threshold. The priority threshold may be a preconfigured threshold value that the other communication must meet or exceed before the scheduled sidelink transmission is to be preempted. In some aspects, the priority threshold may be dynamic. For example, the priority threshold may be based at least in part on the priority of the scheduled sidelink transmission. In this situation, the other communication may satisfy the threshold (and the one or more conditions for preemption) if the other communication is associated with a priority that exceeds the priority of the scheduled sidelink transmission. By way of example, if the scheduled sidelink transmission is for an eMBB communication, and the other communication is a URLLC communication, the other communication may satisfy the threshold as URLLC communications may be considered more urgent than the eMBB communications. Other measures of priority and thresholds may be used to determine whether conditions for preemption of the scheduled sidelink transmission are met.

In some aspects, the UE may determine that transmission of the scheduled sidelink transmission will not use a set of resources from the resources that were scheduled for the sidelink transmission. For example, the network entity may allocate resources for the sidelink transmission based at least in part on communications parameters (e.g., MCS) for communications between the UE and the sidelink UE. In some situations, the UE may not need to use all of the allocated resources for the sidelink transmission. For example, in favorable channel conditions, the UE may adjust communications parameters for the sidelink (e.g., increasing MCS based on an improvement in channel conditions), which may result in the UE not needing to use all of the allocated resources for the sidelink transmission, leaving a set of resources un-used. In this situation, the UE may determine that conditions have been met to preempt the set of resources, as they will no longer be used by the UE for the scheduled sidelink transmission.

Other conditions for preemption may also be used, and any combination of conditions may be used for the UE to determine whether the scheduled sidelink transmission should be preempted. In addition, the UE may be configured with exceptions for certain types of network traffic, and/or conditions for preemption may be dynamically adjusted (e.g., by the UE and/or based on updated configuration information from the network entity).

As shown by reference number 720, the network entity may monitor resources associated with one or more SLPI occasions to detect the SLPI. For example, the network entity may have configured resources for one or more SLPI occasions, which the UE may use to transmit an SLPI. In this situation, the network entity may monitor the SLPI occasions in an effort to detect when an SLPI is transmitted by the UE.

As shown by reference number 725, the UE may transmit an SLPI that indicates a set of resources associated with the scheduled sidelink transmission are to be preempted. The SLPI may be transmitted to a network entity and/or the sidelink UE. In some aspects, the set of resources may be a portion, or all, of the resources allocated for the scheduled sidelink transmission. In other words, the scheduled sidelink transmission may be completely preempted (i.e., cancelled), or partially preempted (e.g., leaving a portion of the scheduled sidelink transmission to be transmitted).

In some aspects, the SLPI may be transmitted to the sidelink UE (e.g., the sidelink UE 120-2) via a sidelink control channel (e.g., PSCCH), an RRC message, and/or a sidelink feedback channel (e.g., PSFCH). The resources used to transmit the SLPI to the sidelink UE may be preconfigured by the network entity. For example, the UE may receive data identifying the resources from the network entity (e.g., in the configuration information and/or in association with the scheduling DCI).

The SLPI may be transmitted before and/or after the scheduled sidelink transmission was to be transmitted. In some aspects, the SLPI may be transmitted before the scheduled sidelink transmission based at least in part on resources being available prior to the scheduled sidelink transmission or the scheduled sidelink transmission. For example, if the resources for the SLPI are available, the UE may transmit the SLPI before the scheduled sidelink transmission is preempted.

In some aspects, the SLPI may be transmitted after the scheduled sidelink transmission was scheduled to be transmitted based at least in part on resources being unavailable prior to the scheduled sidelink transmission or the scheduled sidelink transmission. For example, if the resources for the SLPI are not available before the preemption is to occur, the UE may transmit the SLPI after the scheduled sidelink transmission is preempted.

In some aspects, the UE may transmit the SLPI both before and after the preemption of the scheduled sidelink transmission. For example, the UE may transmit one SLPI to the network entity before the preemption and another SLPI to the sidelink UE after the preemption. In some aspects, the UE may be configured with a preference for transmitting the SLPI before and/or after the preemption occurs. For example, the UE may be configured to transmit the SLPI before the preemption occurs if the resources are available, but after the preemption occurs if the resources are not available.

In some aspects, the SLPI may be transmitted based at least in part on an amount of time between a last symbol of the SLPI and a first symbol of the scheduled sidelink transmission satisfying a time threshold. For example, when the SLPI is transmitted prior to the preemption occurring, the UE may want to ensure there is enough time for the network entity and/or UE to process the SLPI. In this situation, the time threshold may be based at least in part on an SLPI processing time. The SLPI processing time may be based at least in part on a network entity or UE capability, and/or subcarrier spacing associated with the scheduled sidelink transmission. The processing time, and effect of subcarrier spacing, may be indicated by the configuration information.

In some aspects, there may be multiple time thresholds. For example, a minimum time threshold may be used, as described herein, to ensure there is enough time to process the SLPI. A maximum time threshold may also be used. For example, the SLPI may be transmitted based at least in part on the amount of time between the last symbol of the SLPI and a first symbol of the scheduled sidelink transmission satisfying a maximum time threshold. In other words, the UE may not send the SLPI if it is too early. In this situation, other methods may enable the UE to transmit a more urgent communication without needing to preempt the scheduled sidelink transmission, so the UE may wait until preemption is within the minimum time threshold before transmitting the SLPI.

As described herein, the SLPI may be transmitted after the scheduled sidelink transmission was to be transmitted. In this situation, the UE may transmit the SLPI based at least in part on an amount of time between a last symbol of the scheduled sidelink transmission and a first symbol of the SLPI satisfying a time threshold. For example, if the UE is unable to transmit the SLPI before a certain amount of time elapses, the UE may not need to transmit the SLPI (e.g., because other processes to handle the result of preemption may have already started, such as retransmission scheduling).

In some aspects, the SLPI may be transmitted using preconfigured uplink resources, such as preconfigured PUCCH resources. In some aspects, the SLPI may be transmitted as part of another communication (e.g., rather than a stand-alone indication). For example, the SLPI may be multiplexed with other uplink control information using PUCCH resources. For example, the SLPI may be included in a CSI report and/or a HARQ communication, among other examples.

In some aspects, the SLPI may be transmitted using preconfigured sidelink resources, such as preconfigured PSCCH resources. In some aspects, the SLPI is included in sidelink control information included in the scheduled sidelink transmission. In this situation, the UE may not preempt the sidelink resources associated with the SLPI (e.g., to ensure the sidelink UE receives the SLPI).

In some aspects, the SLPI may identify the set of resources (e.g., the resources being preempted) using preconfigured symbols and subchannels. For example, a payload of the SLPI may be configured to indicate, within 14 bits, the symbols and/or subchannels that are preempted (e.g., similar to uplink and downlink cancellation indications). In this situation, the payload may indicate the portion of time and frequency resources that are preempted. The portion of the payload may be configured, for example, via the configuration information.

In some aspects, the SLPI indicates that the preemption of the scheduled sidelink communication is for a particular other communication. For example, the SLPI may indicate that the set of resources is being preempted to transmit (or receive) a higher priority communication. In some aspects, the SLPI indicates a period of time for which sidelink communications may be suspended. For example, the UE may have a significant amount of high priority communications transmit and/or receive, and the UE may want to pause lower priority sidelink communications until the high priority communications have been transmitted and/or received.

In some aspects, the SLPI indicates updated sidelink transmission parameters, such as an updated MCS parameter associated with the scheduled sidelink transmission, and/or an updated packet size associated with the scheduled sidelink transmission. For example, in a situation where the UE is preempting the set of resources because they are no longer needed for the sidelink communication (e.g., due to an improvement in sidelink channel conditions, increase in MCS, decrease in sidelink packet size, and/or the like), updated sidelink transmission parameters may enable the network entity to schedule further sidelink communications based at least in part on the modified sidelink transmission parameters.

As noted herein, the SLPI may be used to preempt some or all of the resources allocated for the scheduled sidelink transmission. In some aspects, the set of resources that are preempted may be canceled (e.g., no longer used by the UE and/or network entity). In some aspects, the preempted resources may be re-used for another purpose (e.g., used for transmission/reception of another communication) by the network entity and/or the UE, as described herein.

As shown by reference number 730, the UE may use the set of resources for transmission or reception of another communication. For example, in a situation where the set of resources was preempted due to a higher priority communication, the UE may use the set of resources to transmit and/or receive the higher priority communication.

As shown by reference number 735, the network entity may process, based at least in part on detecting the SLPI, data associated with the set of resources. For example, the SLPI may be used for the UE to transmit an urgent communication to the network entity. To obtain the communication, the network entity may decode a PUSCH communication associated with the set of resources (e.g., multiplexed with the SLPI), and/or decode a reference signal associated with the set of resources (e.g., a sounding reference signal, positioning reference signal, and/or the like).

In some aspects, the network entity may determine, based at least in part on the SLPI, that the UE indicated one or more modified sidelink transmission parameters (e.g., modified MCS and/or sidelink packet size). In this situation the network entity may use the modified sidelink parameters when scheduling future sidelink communications between the UE and the sidelink UE.

As shown by reference number 740, the network entity may transmit and/or receive, based on receiving the SLPI, another communication associated with the set of resources. For example, the SLPI may indicate that the set of resources is free to use, and the network entity may use the set of resources to transmit and/or receive another communication. In some aspects, as described herein, the network entity may transmit or receive the other communication based at least in part on modified sidelink transmission parameters included in the SLPI.

As shown by reference number 745, the network entity may schedule retransmission of the sidelink transmission based at least in part on receiving the SLPI. For example, in a situation where the SLPI preempts the scheduled sidelink transmission, the UE may reschedule the sidelink transmission for another time. In a situation where the SLPI indicates the UE has paused sidelink communications, the network entity may wait until the indicated time has elapsed prior to rescheduling the sidelink transmission. In some aspects, the network entity may schedule retransmission of the sidelink transmission via another UE, different from the UE, based at least in part on the SLPI.

Note that while various portions of example 700 are depicted as occurring in a particular order, the order in which they occur may vary. For example, the UE may transmit the SLPI before and/or after a period of time associated with the resources scheduled for the sidelink transmission, monitoring may continue to occur at the network entity at a time not only between DCI transmission and SLPI reception, and configuration information may be transmitted and/or received throughout.

As indicated above, FIG. 7 is provided as an example. Other examples may differ from what is described with regard to FIG. 7.

Figure 8:
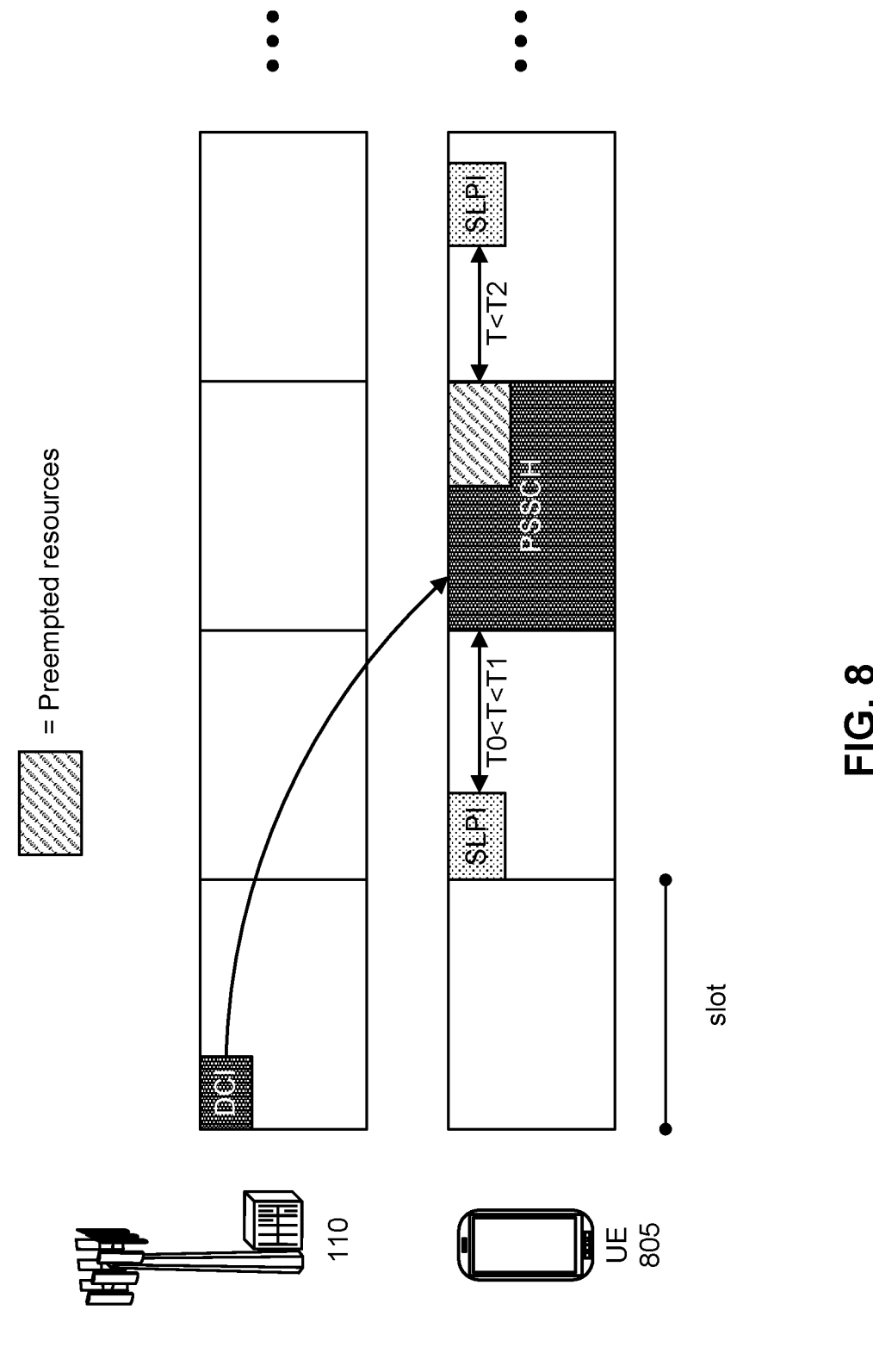
FIG. 8 is a diagram illustrating an example associated with associated with sidelink preemption indication timing, in accordance with the present disclosure.

FIG. 8 is a diagram illustrating an example 800 associated with SLPI timing, in accordance with the present disclosure. As shown in FIG. 8, a base station 110 and a UE 805 (e.g., a UE 120) may communicate with one another. The UE 805 may also be in communication with a sidelink UE (e.g., a UE 120, not shown) via a sidelink, as described herein.

In this example 800, the base station has transmitted, to the UE 805, DCI scheduling a PSSCH communication. Occasions for the SLPI are depicted in both the slot before and after the scheduled PSSCH communication. The timing of the SLPI occasions is also indicated with reference to multiple time thresholds. In this example, the amount of time Tbetween the last symbol of the SLPI and the first symbol of the PSSCH should be between T0 and T1 (e.g., in order to provide time for the SLPI to be processed). As also shown in this example, for the SLPI transmitted after the PSSCH, the amount of time T between the last symbol of the PSSCH and the first symbol of the SLPI should be less than T2 (e.g., to avoid other mechanisms associated with retransmission, or dropped communications, to occur). In this example, only a portion of the PSSCH resources are depicted as being preempted, the remainder of the PSSCH may be transmitted, as scheduled.

As indicated above, FIG. 8 is provided as an example. Other examples may differ from what is described with respect to FIG. 8.

Figure 9:
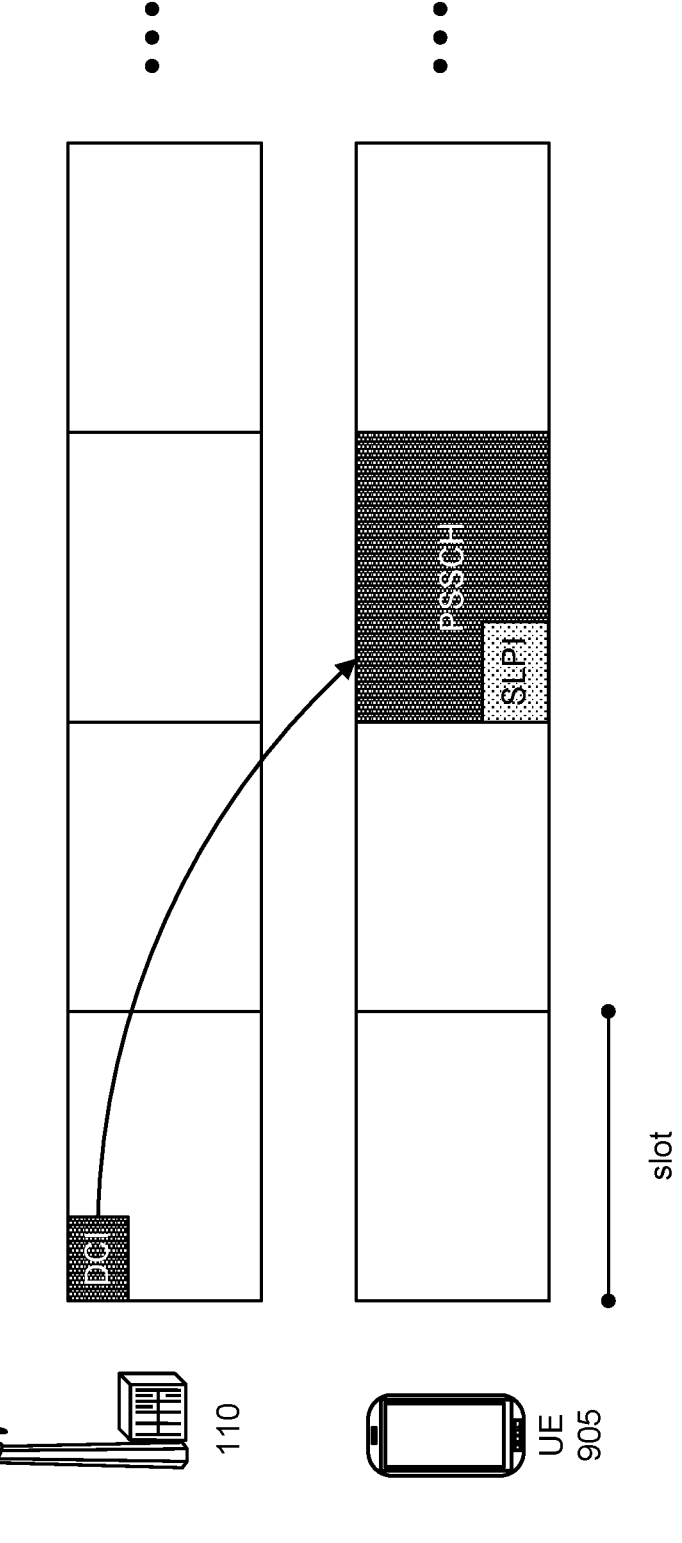
FIG. 9 is a diagram illustrating an example associated with sidelink preemption indication inclusion in a sidelink communication, in accordance with the present disclosure.

FIG. 9 is a diagram illustrating an example 900 associated with SLPI inclusion in a sidelink communication, in accordance with the present disclosure. As shown in FIG. 9, a base station 110 and a UE 905 (e.g., a UE 120) may communicate with one another. The UE 905 may also be in communication with a sidelink UE (e.g., a UE 120, not shown) via a sidelink, as described herein.

In this example 900, the base station has transmitted, to the UE 905, DCI scheduling a PSSCH communication. The resources for the SLPI, however, are included in the resources allocated for the PSSCH communication. In this situation, the sidelink UE may receive the SLPI at the time it expects to receive the PSSCH and determine, from the SLPI, that a portion of the PSSCH was preempted. Similarly, the network entity may monitor the occasion associated with the SLPI to determine whether the PSSCH is preempted and which resources are preempted. While this option may not enable the base station to re-use the preempted resources, the inclusion of the SLPI in the preempted communication may use less network overhead and/or resources than SLPIs transmitted in separate SLPI occasions (e.g., in different slots, as depicted in FIG. 8). In this example, the entire PSSCH is shown as being preempted (e.g., no separate set of resources being preempted), though in some situations only a portion of the PSSCH resources may be preempted, as described herein.

As indicated above, FIG. 9 is provided as an example. Other examples may differ from what is described with respect to FIG. 9.

Figure 10:
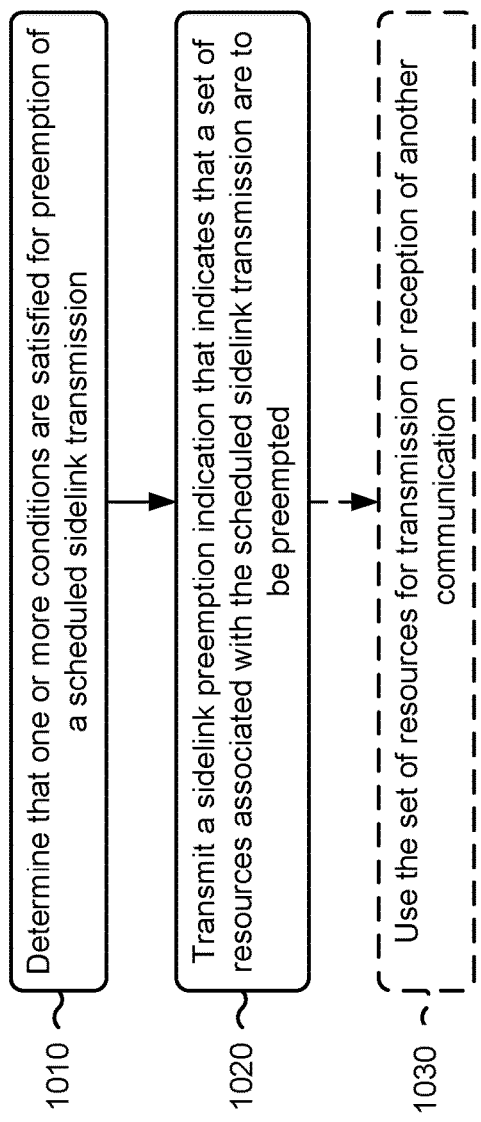

FIG. 10 is a diagram illustrating an example process 1000 performed, for example, by a UE, in accordance with the present disclosure. Example process 1000 is an example where the UE (e.g., UE 120) performs operations associated with user equipment preemption of sidelink communications.

As shown in FIG. 10, in some aspects, process 1000 may include determining that one or more conditions are satisfied for preemption of a scheduled sidelink transmission (block 1010). For example, the UE (e.g., using communication manager 140 and/or determination component 1208, depicted in FIG. 12) may determine that one or more conditions are satisfied for preemption of a scheduled sidelink transmission, as described above.

As further shown in FIG. 10, in some aspects, process 1000 may include transmitting a sidelink preemption indication that indicates that a set of resources associated with the scheduled sidelink transmission are to be preempted (block 1020). For example, the UE (e.g., using communication manager 140 and/or transmission component 1204, depicted in FIG. 12) may transmit a sidelink preemption indication that indicates that a set of resources associated with the scheduled sidelink transmission are to be preempted, as described above.

As further shown in FIG. 10, in some aspects, process 1000 may include using the set of resources for transmission or reception of another communication (block 1030). For example, the UE (e.g., using communication manager 140 and/or scheduling component 1210, depicted in FIG. 12) may use the set of resources for transmission or reception of another communication, as described above.

Process 1000 may include additional aspects, such as any single aspect or any combination of aspects described below and/or in connection with one or more other processes described elsewhere herein.

In a first aspect, the sidelink preemption indication is transmitted before the scheduled sidelink transmission is to be transmitted.

In a second aspect, alone or in combination with the first aspect, transmitting the sidelink preemption indication comprises transmitting the sidelink preemption indication based at least in part on an amount of time between a last symbol of the sidelink preemption indication and a first symbol of the scheduled sidelink transmission satisfying a time threshold.

In a third aspect, alone or in combination with one or more of the first and second aspects, the time threshold is based at least in part on a sidelink preemption indication processing time.

In a fourth aspect, alone or in combination with one or more of the first through third aspects, the sidelink preemption indication processing time is based at least in part on one or more of a network entity capability or subcarrier spacing associated with the scheduled sidelink transmission.

In a fifth aspect, alone or in combination with one or more of the first through fourth aspects, the time threshold is a maximum time threshold, and transmitting the sidelink preemption indication comprises transmitting the sidelink preemption indication further based at least in part on the amount of time satisfying a minimum time threshold.

In a sixth aspect, alone or in combination with one or more of the first through fifth aspects, the sidelink preemption indication is transmitted after the scheduled sidelink transmission was to be transmitted.

In a seventh aspect, alone or in combination with one or more of the first through sixth aspects, transmitting the sidelink preemption indication comprises transmitting the sidelink preemption indication based at least in part on an amount of time between a last symbol of the scheduled sidelink transmission and a first symbol of the sidelink preemption indication satisfying a time threshold.

In an eighth aspect, alone or in combination with one or more of the first through seventh aspects, transmitting the sidelink preemption indication comprises transmitting the sidelink preemption indication before the scheduled sidelink transmission is to be transmitted based at least in part on resources being available prior to the scheduled sidelink transmission, or transmitting the sidelink preemption indication after the scheduled sidelink transmission is to be transmitted based at least in part on resources being unavailable prior to the scheduled sidelink transmission.

In a ninth aspect, alone or in combination with one or more of the first through eighth aspects, transmitting the sidelink preemption indication comprises transmitting the sidelink preemption indication using preconfigured physical uplink control channel resources.

In a tenth aspect, alone or in combination with one or more of the first through ninth aspects, transmitting the sidelink preemption indication comprises multiplexing the sidelink preemption indication with other uplink control information using physical uplink control channel resources.

In an eleventh aspect, alone or in combination with one or more of the first through tenth aspects, the other uplink control information comprises at least one of a channel state information report, or a hybrid automatic repeat request communication.

In a twelfth aspect, alone or in combination with one or more of the first through eleventh aspects, transmitting the sidelink preemption indication comprises transmitting the sidelink preemption indication to a sidelink receiver UE associated with the scheduled sidelink transmission.

In a thirteenth aspect, alone or in combination with one or more of the first through twelfth aspects, transmitting the sidelink preemption indication comprises transmitting the sidelink preemption indication via at least one of a sidelink control channel, a radio resource control message, or a physical sidelink feedback channel.

In a fourteenth aspect, alone or in combination with one or more of the first through thirteenth aspects, process 1000 includes receiving, from a network entity, data identifying resources for transmission of the sidelink preemption indication.

In a fifteenth aspect, alone or in combination with one or more of the first through fourteenth aspects, the sidelink preemption indication is included in sidelink control information included in the scheduled sidelink transmission.

In a sixteenth aspect, alone or in combination with one or more of the first through fifteenth aspects, the sidelink preemption indication identifies the set of resources using preconfigured symbols and subchannels.

In a seventeenth aspect, alone or in combination with one or more of the first through sixteenth aspects, the sidelink preemption indication indicates that preemption is for the other communication.

In an eighteenth aspect, alone or in combination with one or more of the first through seventeenth aspects, the sidelink preemption indication indicates a period of time for which sidelink communications are to be suspended.

In a nineteenth aspect, alone or in combination with one or more of the first through eighteenth aspects, the sidelink preemption indication indicates updated sidelink transmission parameters, the updated sidelink transmission parameters comprising one or more of an updated modulation and coding scheme parameter associated with the scheduled sidelink transmission, or an updated packet size associated with the scheduled sidelink transmission.

In a twentieth aspect, alone or in combination with one or more of the first through nineteenth aspects, determining that the one or more conditions are satisfied comprises at least one of determining that the other communication has a priority that satisfies a priority threshold, or determining that transmission of the scheduled sidelink transmission will not use the set of resources.

In a twenty-first aspect, alone or in combination with one or more of the first through twentieth aspects, the priority threshold is a preconfigured priority threshold.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram illustrating an example process 1100 performed, for example, by a network entity, in accordance with the present disclosure. Example process 1100 is an example where the network entity (e.g., base station 110) performs operations associated with user equipment preemption of sidelink communications.

As shown in FIG. 11, in some aspects, process 1100 may include transmitting downlink control information associated with scheduling a sidelink transmission (block 1110). For example, the network entity (e.g., using communication manager 150 and/or transmission component 1304, depicted in FIG. 13) may transmit downlink control information associated with scheduling a sidelink transmission, as described above.

As further shown in FIG. 11, in some aspects, process 1100 may include receiving a sidelink preemption indication that indicates that a set of resources associated with the sidelink transmission are to be preempted (block 1120). For example, the network entity (e.g., using communication manager 150 and/or reception component 1302, depicted in FIG. 13) may receive a sidelink preemption indication that indicates that a set of resources associated with the sidelink transmission are to be preempted, as described above.

As further shown in FIG. 11, in some aspects, process 1100 may include transmitting or receiving, based on receiving the sidelink preemption indication, another communication associated with the set of resources (block 1130). For example, the network entity (e.g., using communication manager 150 and/or transmission component 1304, depicted in FIG. 13) may transmit or receiving, based on receiving the sidelink preemption indication, another communication associated with the set of resources, as described above.

Process 1100 may include additional aspects, such as any single aspect or any combination of aspects described below and/or in connection with one or more other processes described elsewhere herein.

In a first aspect, process 1100 includes transmitting, to a UE, configuration information, the configuration information indicating resources for transmission of the sidelink preemption indication.

In a second aspect, alone or in combination with the first aspect, the resources are configured for semi-static activation.

In a third aspect, alone or in combination with one or more of the first and second aspects, the resources are configured for semi-persistent activation.

In a fourth aspect, alone or in combination with one or more of the first through third aspects, the resources are configured for aperiodic activation.

In a fifth aspect, alone or in combination with one or more of the first through fourth aspects, the configuration information indicates a priority threshold indicating for the UE to determine whether to preempt the sidelink transmission.

In a sixth aspect, alone or in combination with one or more of the first through fifth aspects, process 1100 includes monitoring resources associated with one or more sidelink preemption indication occasions to detect the sidelink preemption indication, and processing, based at least in part on detecting the sidelink preemption indication, data associated with the set of resources.

In a seventh aspect, alone or in combination with one or more of the first through sixth aspects, processing the data comprises decoding one or more of a physical uplink shared channel communication associated with the set of resources, or a reference signal associated with the set of resources.

In an eighth aspect, alone or in combination with one or more of the first through seventh aspects, process 1100 includes determining, based at least in part on the sidelink preemption indication, that a UE, associated with the sidelink transmission, indicated one or more modified sidelink transmission parameters, and transmitting the other communication based at least in part on the modified sidelink transmission parameters.

In a ninth aspect, alone or in combination with one or more of the first through eighth aspects, the sidelink preemption indication is received before the sidelink transmission is to be transmitted.

In a tenth aspect, alone or in combination with one or more of the first through ninth aspects, the configuration information indicates that the UE is to transmit the sidelink preemption indication based at least in part on an amount of time between a last symbol of the sidelink preemption indication and a first symbol of the sidelink transmission satisfying a time threshold.

In an eleventh aspect, alone or in combination with one or more of the first through tenth aspects, the time threshold is based at least in part on a sidelink preemption indication processing time.

In a twelfth aspect, alone or in combination with one or more of the first through eleventh aspects, the sidelink preemption indication processing time is based at least in part on one or more of a capability associated with the network entity or subcarrier spacing associated with the sidelink transmission.

In a thirteenth aspect, alone or in combination with one or more of the first through twelfth aspects, the time threshold is a maximum time threshold, and the configuration information indicates that the UE is to transmit the sidelink preemption indication further based at least in part on the amount of time satisfying a minimum time threshold.

In a fourteenth aspect, alone or in combination with one or more of the first through thirteenth aspects, the sidelink preemption indication is transmitted after the sidelink transmission was to be transmitted.

In a fifteenth aspect, alone or in combination with one or more of the first through fourteenth aspects, the configuration information indicates that the UE is to transmit the sidelink preemption indication based at least in part on an amount of time between a last symbol of the sidelink transmission and a first symbol of the sidelink preemption indication satisfying a time threshold.

In a sixteenth aspect, alone or in combination with one or more of the first through fifteenth aspects, receiving the sidelink preemption indication comprises receiving the sidelink preemption indication multiplexed with other uplink control information and via physical uplink control channel resources.

In a seventeenth aspect, alone or in combination with one or more of the first through sixteenth aspects, the other uplink control information comprises at least one of a channel state information report, or a hybrid automatic repeat request communication.

In an eighteenth aspect, alone or in combination with one or more of the first through seventeenth aspects, the sidelink preemption indication identifies the set of resources using preconfigured symbols and subchannels.

In a nineteenth aspect, alone or in combination with one or more of the first through eighteenth aspects, the sidelink preemption indication indicates that preemption is for the other communication.

In a twentieth aspect, alone or in combination with one or more of the first through nineteenth aspects, the sidelink preemption indication indicates a period of time for which sidelink communications are to be suspended.

In a twenty-first aspect, alone or in combination with one or more of the first through twentieth aspects, process 1100 includes scheduling retransmission of the sidelink transmission based at least in part on receiving the sidelink preemption indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
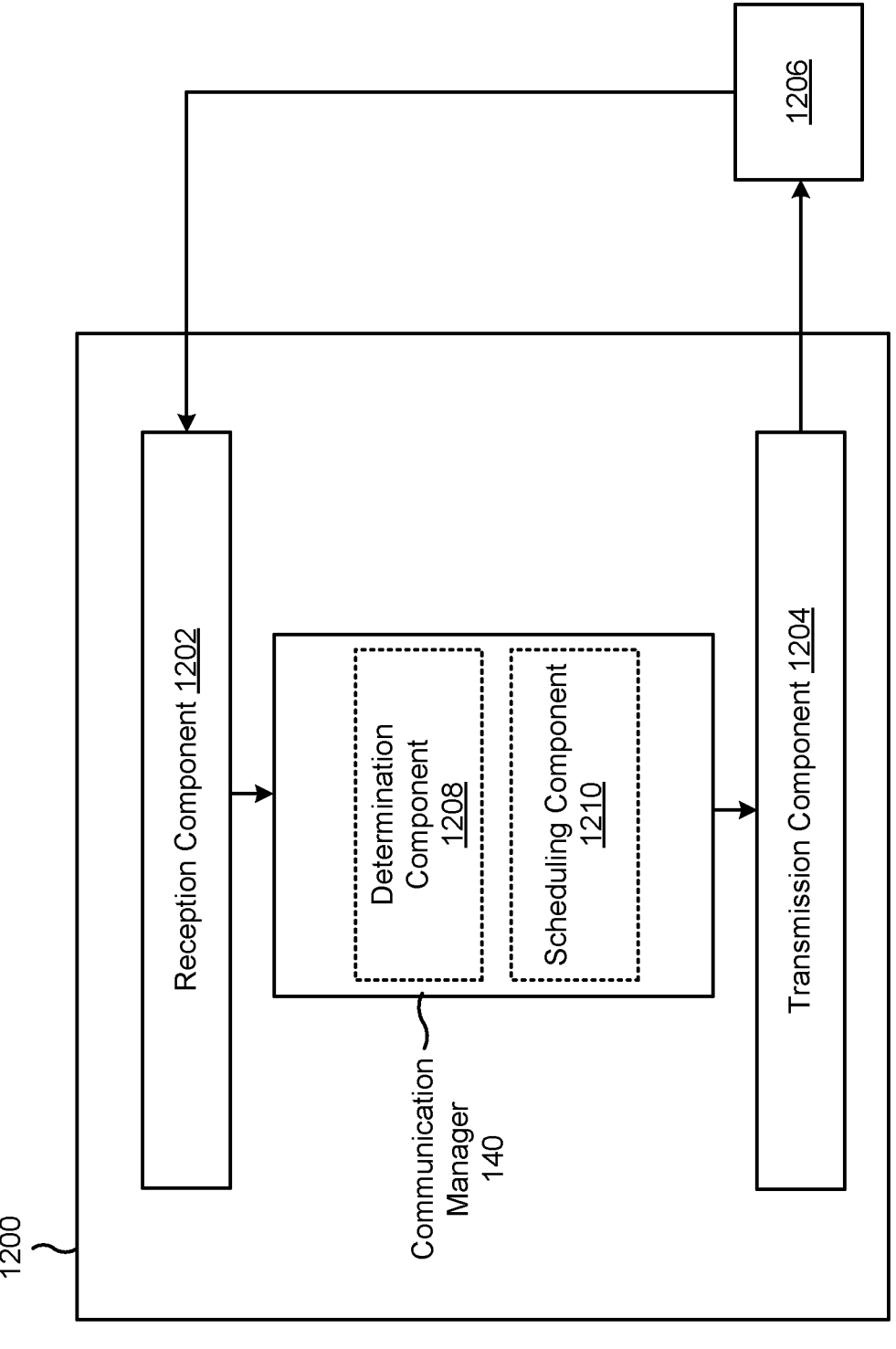
FIGS. 12-13 are diagrams of example apparatuses for wireless communication, in accordance with the present disclosure.

FIG. 12 is a diagram of an example apparatus 1200 for wireless communication. The apparatus 1200 may be a UE, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 140. The communication manager 140 may include one or more of a determination component 1208, or a scheduling component 1210, among other examples.

In some aspects, the apparatus 1200 may be configured to perform one or more operations described herein in connection with FIGS. 4-9. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The determination component 1208 may determine that one or more conditions are satisfied for preemption of a scheduled sidelink transmission. The transmission component 1204 may transmit a sidelink preemption indication that indicates that a set of resources associated with the scheduled sidelink transmission are to be preempted. The scheduling component 1210 may use the set of resources for transmission or reception of another communication.

The reception component 1202 may receive, from a network entity, data identifying resources for transmission of the sidelink preemption indication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
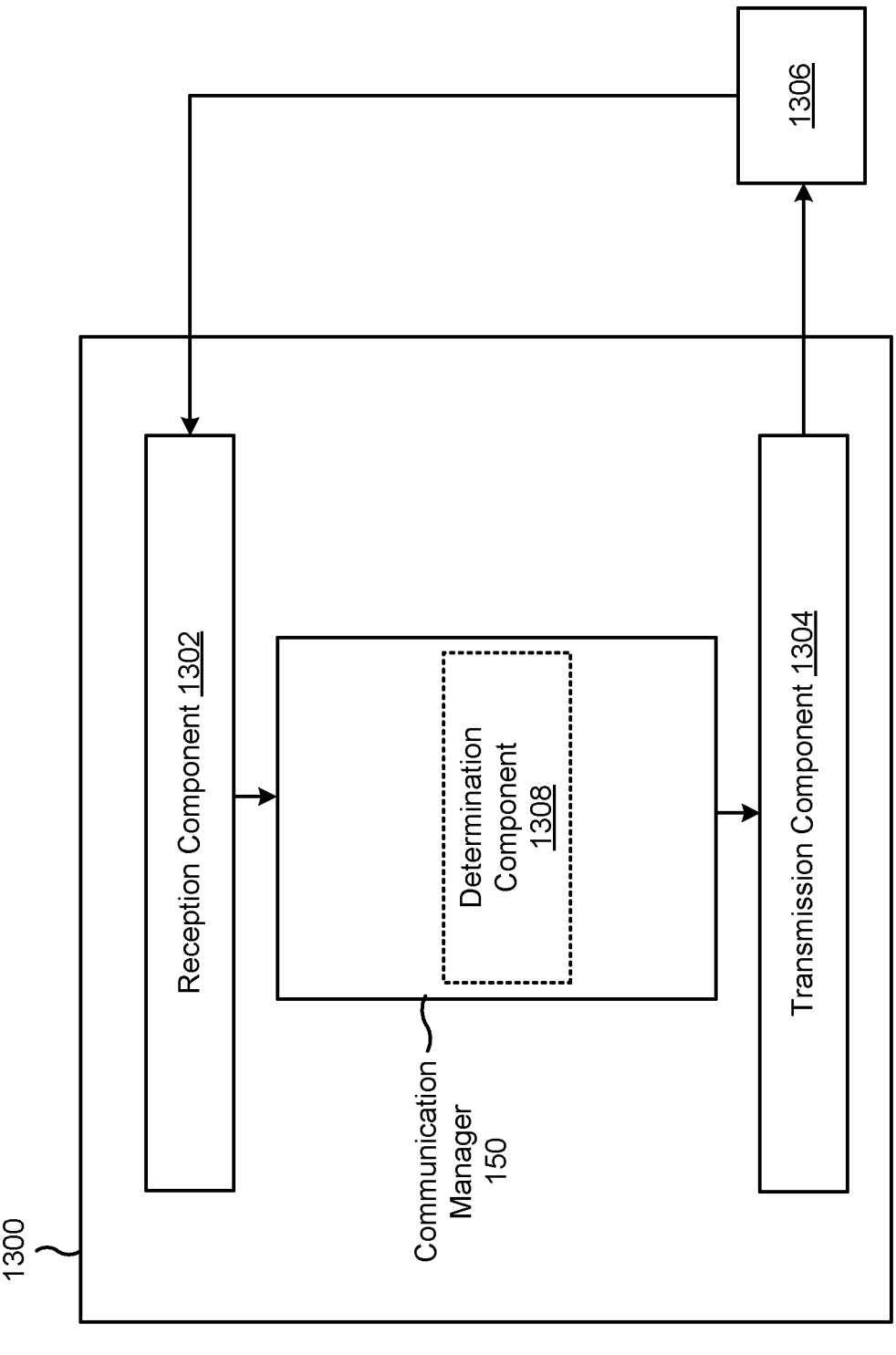

FIG. 13 is a diagram of an example apparatus 1300 for wireless communication. The apparatus 1300 may be a network entity (e.g., base station 110 of FIG. 1), or a network entity may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 150. The communication manager 150 may include a determination component 1308, among other examples.

In some aspects, the apparatus 1300 may be configured to perform one or more operations described herein in connection with FIGS. 4-9. Additionally, or alternatively, the apparatus 1300 may be configured to perform one or more processes described herein, such as process 1100 of FIG. 11. In some aspects, the apparatus 1300 and/or one or more components shown in FIG. 13 may include one or more components of the network entity described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network entity described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the network entity described in connection with FIG. 2. In some aspects, the transmission component 1304 may be co-located with the reception component 1302 in a transceiver.

The transmission component 1304 may transmit downlink control information associated with scheduling a sidelink transmission. The reception component 1302 may receive a sidelink preemption indication that indicates that a set of resources associated with the sidelink transmission are to be preempted. The transmission component 1304 may transmit or receive, based on receiving the sidelink preemption indication, another communication associated with the set of resources.

The transmission component 1304 may transmit, to a UE, configuration information the configuration information indicating resources for transmission of the sidelink preemption indication.

The determination component 1308 may determine, based at least in part on the sidelink preemption indication, that a UE, associated with the sidelink transmission, indicated one or more modified sidelink transmission parameters.

The transmission component 1304 may transmit the other communication based at least in part on the modified sidelink transmission parameters.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a UE, comprising: determining that one or more conditions are satisfied for preemption of a scheduled sidelink transmission; transmitting a sidelink preemption indication that indicates that a set of resources associated with the scheduled sidelink transmission are to be preempted; and using the set of resources for transmission or reception of another communication.

Aspect 2: The method of Aspect 1, wherein the sidelink preemption indication is transmitted before the scheduled sidelink transmission is to be transmitted.

Aspect 3: The method of Aspect 2, wherein transmitting the sidelink preemption indication comprises: transmitting the sidelink preemption indication based at least in part on an amount of time between a last symbol of the sidelink preemption indication and a first symbol of the scheduled sidelink transmission satisfying a time threshold.

Aspect 4: The method of Aspect 3, wherein the time threshold is based at least in part on a sidelink preemption indication processing time.

Aspect 5: The method of Aspect 4, wherein the sidelink preemption indication processing time is based at least in part on one or more of a network entity capability or subcarrier spacing associated with the scheduled sidelink transmission.

Aspect 6: The method of Aspect 3, wherein the time threshold is a maximum time threshold, and transmitting the sidelink preemption indication comprises: transmitting the sidelink preemption indication further based at least in part on the amount of time satisfying a minimum time threshold.

Aspect 7: The method of any of Aspects 1-6, wherein the sidelink preemption indication is transmitted after the scheduled sidelink transmission was to be transmitted.

Aspect 8: The method of Aspect 7, wherein transmitting the sidelink preemption indication comprises: transmitting the sidelink preemption indication based at least in part on an amount of time between a last symbol of the scheduled sidelink transmission and a first symbol of the sidelink preemption indication satisfying a time threshold.

Aspect 9: The method of any of Aspects 1-8, wherein transmitting the sidelink preemption indication comprises: transmitting the sidelink preemption indication before the scheduled sidelink transmission is to be transmitted based at least in part on resources being available prior to the scheduled sidelink transmission; or transmitting the sidelink preemption indication after the scheduled sidelink transmission is to be transmitted based at least in part on resources being unavailable prior to the scheduled sidelink transmission.

Aspect 10: The method of any of Aspects 1-9, wherein transmitting the sidelink preemption indication comprises: transmitting the sidelink preemption indication using preconfigured physical uplink control channel resources.

Aspect 11: The method of any of Aspects 1-10, wherein transmitting the sidelink preemption indication comprises: multiplexing the sidelink preemption indication with other uplink control information using physical uplink control channel resources.

Aspect 12: The method of Aspect 11, wherein the other uplink control information comprises at least one of: a channel state information report, or a hybrid automatic repeat request communication.

Aspect 13: The method of any of Aspects 1-12, wherein transmitting the sidelink preemption indication comprises: transmitting the sidelink preemption indication to a sidelink receiver UE associated with the scheduled sidelink transmission.

Aspect 14: The method of Aspect 13, wherein transmitting the sidelink preemption indication comprises: transmitting the sidelink preemption indication via at least one of: a sidelink control channel, a radio resource control message, or a physical sidelink feedback channel.

Aspect 15: The method of Aspect 13, further comprising: receiving, from a network entity, data identifying resources for transmission of the sidelink preemption indication.

Aspect 16: The method of any of Aspects 1-15, wherein the sidelink preemption indication is included in sidelink control information included in the scheduled sidelink transmission.

Aspect 17: The method of any of Aspects 1-16, wherein the sidelink preemption indication identifies the set of resources using preconfigured symbols and subchannels.

Aspect 18: The method of any of Aspects 1-17, wherein the sidelink preemption indication indicates that preemption is for the other communication.

Aspect 19: The method of any of Aspects 1-18, wherein the sidelink preemption indication indicates a period of time for which sidelink communications are to be suspended.

Aspect 20: The method of any of Aspects 1-19, wherein the sidelink preemption indication indicates updated sidelink transmission parameters, the updated sidelink transmission parameters comprising one or more of: an updated modulation and coding scheme parameter associated with the scheduled sidelink transmission, or an updated packet size associated with the scheduled sidelink transmission.

Aspect 21: The method of any of Aspects 1-20, wherein determining that the one or more conditions are satisfied comprises at least one of: determining that the other communication has a priority that satisfies a priority threshold, or determining that transmission of the scheduled sidelink transmission will not use the set of resources.

Aspect 22: The method of Aspect 21, wherein the priority threshold is a preconfigured priority threshold.

Aspect 23: A method of wireless communication performed by a network entity, comprising: transmitting downlink control information associated with scheduling a sidelink transmission; receiving a sidelink preemption indication that indicates that a set of resources associated with the sidelink transmission are to be preempted; and transmitting or receiving, based on receiving the sidelink preemption indication, another communication associated with the set of resources.

Aspect 24: The method of Aspect 23, further comprising: transmitting, to a UE, configuration information, the configuration information indicating resources for transmission of the sidelink preemption indication.

Aspect 25: The method of Aspect 24, wherein the resources are configured for semi-static activation.

Aspect 26: The method of Aspect 24, wherein the resources are configured for semi-persistent activation.

Aspect 27: The method of Aspect 24, wherein the resources are configured for aperiodic activation.

Aspect 28: The method of any of Aspects 24-27, wherein the configuration information indicates a priority threshold indicating for the UE to determine whether to preempt the sidelink transmission.

Aspect 29: The method of any of Aspects 23-28, further comprising: monitoring resources associated with one or more sidelink preemption indication occasions to detect the sidelink preemption indication; and processing, based at least in part on detecting the sidelink preemption indication, data associated with the set of resources.

Aspect 30: The method of Aspect 29, wherein processing the data comprises decoding one or more of: a physical uplink shared channel communication associated with the set of resources, or a reference signal associated with the set of resources.

Aspect 31: The method of any of Aspects 23-30, further comprising: determining, based at least in part on the sidelink preemption indication, that a UE, associated with the sidelink transmission, indicated one or more modified sidelink transmission parameters; and transmitting the other communication based at least in part on the modified sidelink transmission parameters.

Aspect 32: The method of any of Aspects 23-31, wherein the sidelink preemption indication is received before the sidelink transmission is to be transmitted.

Aspect 33: The method of any of Aspects 24-32, wherein the configuration information indicates that the UE is to transmit the sidelink preemption indication based at least in part on an amount of time between a last symbol of the sidelink preemption indication and a first symbol of the sidelink transmission satisfying a time threshold.

Aspect 34: The method of Aspect 33, wherein the time threshold is based at least in part on a sidelink preemption indication processing time.

Aspect 35: The method of Aspect 34, wherein the sidelink preemption indication processing time is based at least in part on one or more of a capability associated with the network entity or subcarrier spacing associated with the sidelink transmission.

Aspect 36: The method of Aspect 33, wherein the time threshold is a maximum time threshold, and the configuration information indicates that the UE is to transmit the sidelink preemption indication further based at least in part on the amount of time satisfying a minimum time threshold.

Aspect 37: The method of any of Aspects 23-36, wherein the sidelink preemption indication is transmitted after the sidelink transmission was to be transmitted.

Aspect 38: The method of any of Aspects 24-37, wherein the configuration information indicates that the UE is to transmit the sidelink preemption indication based at least in part on an amount of time between a last symbol of the sidelink transmission and a first symbol of the sidelink preemption indication satisfying a time threshold.

Aspect 39: The method of any of Aspects 23-38, wherein receiving the sidelink preemption indication comprises: receiving the sidelink preemption indication multiplexed with other uplink control information and via physical uplink control channel resources.

Aspect 40: The method of Aspect 39, wherein the other uplink control information comprises at least one of: a channel state information report, or a hybrid automatic repeat request communication.

Aspect 41: The method of any of Aspects 23-40, wherein the sidelink preemption indication identifies the set of resources using preconfigured symbols and subchannels.

Aspect 42: The method of any of Aspects 23-41, wherein the sidelink preemption indication indicates that preemption is for the other communication.

Aspect 43: The method of any of Aspects 23-42, wherein the sidelink preemption indication indicates a period of time for which sidelink communications are to be suspended.

Aspect 44: The method of any of Aspects 23-43, further comprising: scheduling retransmission of the sidelink transmission based at least in part on receiving the sidelink preemption indication.

Aspect 45: An apparatus for wireless communication at a device, comprising a processor; memory coupled with the processor; and instructions stored in the memory and executable by the processor to cause the apparatus to perform the method of one or more of Aspects 1-22.

Aspect 46: An apparatus for wireless communication at a device, comprising a processor; memory coupled with the processor; and instructions stored in the memory and executable by the processor to cause the apparatus to perform the method of one or more of Aspects 23-44.

Aspect 47: A device for wireless communication, comprising a memory and one or more processors coupled to the memory, the one or more processors configured to perform the method of one or more of Aspects 1-22.

Aspect 48: A device for wireless communication, comprising a memory and one or more processors coupled to the memory, the one or more processors configured to perform the method of one or more of Aspects 23-44.

Aspect 49: An apparatus for wireless communication, comprising at least one means for performing the method of one or more of Aspects 1-22.

Aspect 50: An apparatus for wireless communication, comprising at least one means for performing the method of one or more of Aspects 23-44.

Aspect 51: A non-transitory computer-readable medium storing code for wireless communication, the code comprising instructions executable by a processor to perform the method of one or more of Aspects 1-22.

Aspect 52: A non-transitory computer-readable medium storing code for wireless communication, the code comprising instructions executable by a processor to perform the method of one or more of Aspects 23-44.

Aspect 53: A non-transitory computer-readable medium storing a set of instructions for wireless communication, the set of instructions comprising one or more instructions that, when executed by one or more processors of a device, cause the device to perform the method of one or more of Aspects 1-22.

Aspect 54: A non-transitory computer-readable medium storing a set of instructions for wireless communication, the set of instructions comprising one or more instructions that, when executed by one or more processors of a device, cause the device to perform the method of one or more of Aspects 23-44.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      determine that one or more conditions are satisfied for preemption of a scheduled sidelink transmission; and
      transmit a sidelink preemption indication that indicates that a set of resources associated with the scheduled sidelink transmission are to be preempted, wherein a sidelink preemption indication processing time is based at least in part on a subcarrier spacing associated with the scheduled sidelink transmission, and wherein the sidelink preemption indication is included in a hybrid automatic repeat request (HARQ) communication.

2. The UE of claim 1, wherein the one or more processors are further configured to:
   use the set of resources for transmission or reception of another communication.

3. The UE of claim 1, wherein the sidelink preemption indication is transmitted before the scheduled sidelink transmission is to be transmitted.

4. The UE of claim 3, wherein the one or more processors, to transmit the sidelink preemption indication, are configured to:
   transmit the sidelink preemption indication based at least in part on an amount of time between a last symbol of the sidelink preemption indication and a first symbol of the scheduled sidelink transmission satisfying a time threshold.

5. The UE of claim 4, wherein the time threshold is based at least in part on the sidelink preemption indication processing time.

6. The UE of claim 5, wherein the sidelink preemption indication processing time is based at least in part on a network entity capability.

7. The UE of claim 4, wherein the time threshold is a maximum time threshold, and transmit the sidelink preemption indication comprises:

transmit the sidelink preemption indication further based at least in part on the amount of time satisfying a minimum time threshold.

8. The UE of claim 1, wherein the sidelink preemption indication is transmitted after the scheduled sidelink transmission was to be transmitted.

9. The UE of claim 8, wherein the one or more processors, to transmit the sidelink preemption indication, are configured to:
   transmit the sidelink preemption indication based at least in part on an amount of time between a last symbol of the scheduled sidelink transmission and a first symbol of the sidelink preemption indication satisfying a time threshold.

10. The UE of claim 1, wherein the one or more processors, to transmit the sidelink preemption indication, are configured to:
   transmit the sidelink preemption indication before the scheduled sidelink transmission is to be transmitted based at least in part on resources being available prior to the scheduled sidelink transmission; or
   transmit the sidelink preemption indication after the scheduled sidelink transmission is to be transmitted based at least in part on the resources being unavailable prior to the scheduled sidelink transmission.

11. The UE of claim 1, wherein the one or more processors, to transmit the sidelink preemption indication, are configured to:
   multiplex the sidelink preemption indication with other uplink control information using physical uplink control channel resources.

12. The UE of claim 1, wherein the one or more processors, to transmit the sidelink preemption indication, are configured to:
   transmit the sidelink preemption indication to a sidelink receiver UE associated with the scheduled sidelink transmission via at least one of:
      a sidelink control channel,
      a radio resource control message, or
      a physical sidelink feedback channel.

13. The UE of claim 1, wherein the sidelink preemption indication is included in sidelink control information included in the scheduled sidelink transmission.

14. The UE of claim 1, wherein the sidelink preemption indication indicates that preemption is for another communication.

15. The UE of claim 1, wherein the sidelink preemption indication indicates a period of time for which sidelink communications are to be suspended.

16. The UE of claim 1, wherein the sidelink preemption indication indicates updated sidelink transmission parameters, the updated sidelink transmission parameters comprising one or more of:
   an updated modulation and coding scheme parameter associated with the scheduled sidelink transmission, or
   an updated packet size associated with the scheduled sidelink transmission.

17. The UE of claim 1, wherein the one or more processors, to determine that the one or more conditions are satisfied, are configured to:
   determine that another communication has a priority that satisfies a priority threshold, or
   determine that transmission of the scheduled sidelink transmission will not use the set of resources.

18. A network entity for wireless communication, comprising:

one or more memories; and one or more processors, coupled to the one or more memories, configured to:

transmit downlink control information associated with scheduling a sidelink transmission;

receive a sidelink preemption indication that indicates that a set of resources associated with the sidelink transmission are to be preempted, wherein a sidelink preemption indication processing time is based at least in part on a subcarrier spacing associated with the sidelink transmission, and wherein the sidelink preemption indication is included in a hybrid automatic repeat request (HARQ) communication; and transmit or receive, based on receiving the sidelink preemption indication, another communication associated with the set of resources.

19. The network entity of claim 18, wherein the one or more processors are further configured to:

transmit, to a user equipment (UE), configuration information, the configuration information indicating resources for transmission of the sidelink preemption indication.

20. The network entity of claim 19, wherein the resources are configured for at least one of:

semi-static activation, semi-persistent activation, or aperiodic activation.

21. The network entity of claim 19, wherein the configuration information indicates a priority threshold for the UE to determine whether to preempt the sidelink transmission.

22. The network entity of claim 18, wherein the one or more processors are further configured to:

monitor resources associated with one or more sidelink preemption indication occasions to detect the sidelink preemption indication; and process, based at least in part on detecting the sidelink preemption indication, data associated with the set of resources.

23. The network entity of claim 22, wherein the one or more processors, to process the data, are configured to decode one or more of:

a physical uplink shared channel communication associated with the set of resources, or a reference signal associated with the set of resources.

24. The network entity of claim 18, wherein the one or more processors are further configured to:

determine, based at least in part on the sidelink preemption indication, that a user equipment (UE), associated with the sidelink transmission, indicated one or more modified sidelink transmission parameters; and transmit the other communication based at least in part on the modified sidelink transmission parameters.

25. The network entity of claim 18, wherein the sidelink preemption indication is received before the sidelink transmission is to be transmitted.

26. The network entity of claim 18, wherein the sidelink preemption indication is transmitted after the sidelink transmission was to be transmitted.

27. The network entity of claim 18, wherein the one or more processors, to receive the sidelink preemption indication, are configured to:

receive the sidelink preemption indication multiplexed with other uplink control information and via physical uplink control channel resources, wherein the other uplink control information comprises at least one of:

a channel state information report, or the HARQ communication.

28. The network entity of claim 18, wherein the one or more processors are further configured to:

schedule retransmission of the sidelink transmission based at least in part on receiving the sidelink preemption indication.

29. A method of wireless communication performed by a user equipment (UE), comprising:

determining that one or more conditions are satisfied for preemption of a scheduled sidelink transmission; and transmitting a sidelink preemption indication that indicates that a set of resources associated with the scheduled sidelink transmission are to be preempted, wherein a sidelink preemption indication processing time is based at least in part on a subcarrier spacing associated with the scheduled sidelink transmission, and wherein the sidelink preemption indication is included in a hybrid automatic repeat request (HARQ) communication.

30. A method of wireless communication performed by a network entity, comprising:

transmitting downlink control information associated with scheduling a sidelink transmission;

receiving a sidelink preemption indication that indicates that a set of resources associated with the sidelink transmission are to be preempted, wherein a sidelink preemption indication processing time is based at least in part on a subcarrier spacing associated with the sidelink transmission, and wherein the sidelink preemption indication is included in a hybrid automatic repeat request (HARQ) communication; and transmitting or receiving, based on receiving the sidelink preemption indication, another communication associated with the set of resources.

* * * * *